(12) United States Patent
Sano

(10) Patent No.: US 11,495,413 B2
(45) Date of Patent: Nov. 8, 2022

(54) FILM CAPACITOR

(71) Applicant: Panasonic Intellectual Property Management Co., Ltd., Osaka (JP)

(72) Inventor: Masahito Sano, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 304 days.

(21) Appl. No.: 16/806,365

(22) Filed: Mar. 2, 2020

(65) Prior Publication Data

US 2020/0203078 A1   Jun. 25, 2020

Related U.S. Application Data

(63) Continuation of application No. PCT/JP2018/033338, filed on Sep. 10, 2018.

(30) Foreign Application Priority Data

Oct. 4, 2017   (JP) .............................. JP2017-194616

(51) Int. Cl.
*H01G 4/32* (2006.01)
*H01G 4/008* (2006.01)
(Continued)

(52) U.S. Cl.
CPC ............... *H01G 4/32* (2013.01); *H01G 4/008* (2013.01); *H01G 4/012* (2013.01); *H01G 4/015* (2013.01); *H01G 4/232* (2013.01)

(58) Field of Classification Search
CPC .......... H01G 4/32; H01G 4/232; H01G 4/008; H01G 4/012; H01G 4/015; H10G 4/012
(Continued)

(56) References Cited

U.S. PATENT DOCUMENTS 5,942,283 A   8/1999 Okuno et al.

FOREIGN PATENT DOCUMENTS

| JP | 10-053859 | 2/1998 |
|----|-----------|--------|
| JP | 2009-224444 | 10/2009 |

(Continued)

OTHER PUBLICATIONS

International Search Report of PCT application No. PCT/JP2018/033338 dated Nov. 20, 2018.

*Primary Examiner* — Arun Ramaswamy
(74) *Attorney, Agent, or Firm* — McDermott Will & Emery LLP

(57) ABSTRACT

A film capacitor includes a first film, a second film, a first electrode part, and a second electrode part. The first electrode part is disposed on a first film surface of the first film. The second electrode part is disposed on a second film surface of the first film or the second film. The first film surface has a first non-electrode part extending along a longitudinal direction of the first film surface. The second film surface has a second non-electrode part extending along a longitudinal direction of the second film surface. A first region having a light transmittance ranging from 30% to 80%, inclusive, is disposed between the first electrode part and the first non-electrode part. A second region having a light transmittance ranging from 30% to 80%, inclusive, is disposed between the second electrode part and the second non-electrode part. A width of each of the first region and the second region is less than or equal to 0.5 mm.

6 Claims, 21 Drawing Sheets

(51) Int. Cl.
*H01G 4/012* (2006.01)
*H01G 4/015* (2006.01)
*H01G 4/232* (2006.01)

(58) Field of Classification Search
USPC .............. 361/503, 511, 273, 301.5, 303, 305
See application file for complete search history.

(56) References Cited

FOREIGN PATENT DOCUMENTS

| | | |
|---|---|---|
| JP | 2011-231389 | 11/2011 |
| JP | 2014-067793 | 4/2014 |
| JP | 2015106608 A * | 6/2015 |

\* cited by examiner

FILM CAPACITOR

RELATED APPLICATIONS

This application is a continuation of the PCT International Application No. PCT/JP2018/033338 filed on Sep. 10, 2018, which claims the benefit of foreign priority of Japanese patent application No. 2017-194616 filed on Oct. 4, 2017, the contents all of which are incorporated herein by reference.

BACKGROUND

1. Technical Field

The present disclosure relates to a film capacitor.

2. Description of the Related Art

Conventionally, there is a known film capacitor formed by winding two dielectric films in a stacked state, the films each having a surface on which deposition electrode is formed by deposition of metal such as aluminum. An example of such a film capacitor having the deposition electrodes is described in Unexamined Japanese Patent Publication No. 2014-067793, for example.

The film capacitor in Unexamined Japanese Patent Publication No. 2014-067793 employs a configuration having two capacitors connected in series. An upper film of the film capacitor includes common electrodes which are deposited on an upper surface thereof at respective left side and right side with respect to a central insulating margin part. The central insulating margin part having a wide width is disposed along a winding direction at a central portion in a width direction of the film. Meanwhile, a lower film of the film capacitor includes a plurality of partial electrodes and a winding-direction insulating margin part disposed along the winding direction at a central portion in a width direction of the film. The plurality of partial electrodes are segmented by width-direction insulating margin parts provided at predetermined intervals in the winding direction and extending in the width direction of the film. The two partial electrodes arranged in the width direction of the film are connected by a fuse pattern. The lower film of the film capacitor further includes end insulating margin parts disposed along the winding direction at respective left end and right end in the width direction.

In a manufacturing process of a film capacitor, deposition electrodes (common electrodes, partial electrodes) are formed by deposition on films by using a vacuum deposition apparatus, for example. In the vacuum deposition apparatus, metal for forming deposition electrodes is sprayed on each of the films from a deposition device. Before each of the films is conveyed to the deposition device, oil is applied to (a) portion(s) on which the metal is not deposited, i.e., (a) non-electrode part(s) of the film as a masking agent for preventing deposition of the metal on the portion(s). For example, in the case of the film capacitor in Unexamined Japanese Patent Publication No. 2014-067793, the oil is applied to the central insulating margin part on the upper film and the winding-direction insulating margin part, the width-direction insulating margin parts, and the end insulating margin parts on the lower film that are the non-electrode parts.

As a method of applying the oil to the film, there are two methods. In one of the two methods, oil in an oil tank is vaporized and sprayed on the non-electrode part(s) of the film from a nozzle (hereinafter referred to as an "oil spraying method"). In the other of the two methods, a printing roll having relief parts formed in (a) pattern(s) of the non-electrode part(s) on a peripheral surface is used, oil is supplied to the relief parts by transfer, and the printing roll is rotated to bring the relief parts into contact with a front surface of the film to thereby print the pattern(s) of the non-electrode part(s) on the front surface (hereinafter referred to as an "oil printing method"). These methods are described in Unexamined Japanese Patent Publication No. 2009-224444, for example.

SUMMARY

A film capacitor according to a first aspect of the present disclosure includes a first film and a second film that are wound or layered in a stacked state, a first electrode part disposed on a first film surface, and a second electrode part disposed on a second film surface. The first film surface is one main surface of the first film. And the second film surface is another main surface of the first film or a main surface of the second film facing the another main surface. Each of the first electrode part and the second electrode part includes an aluminum-containing layer. The first film surface has a first non-electrode part on which the first electrode part is not disposed. The first non-electrode part extends along a longitudinal direction of the first film surface. The second film surface has a second non-electrode part on which the second electrode part is not disposed. The second non-electrode part extends along a longitudinal direction of the second film surface. A first region having a light transmittance ranging from 30% to 80%, inclusive, is disposed between the first electrode part and the first non-electrode part. A width of the first region is less than or equal to 0.5 mm in a width direction perpendicular to the longitudinal direction of the first film surface. A second region having a light transmittance ranging from 30% to 80%, inclusive, is disposed between the second electrode part and the second non-electrode part. A width of the second region is less than or equal to 0.5 mm in a width direction perpendicular to the longitudinal direction of the second film surface.

A film capacitor according to a second aspect of the present disclosure includes a first film and a second film that are wound or layered in a stacked state, a first electrode part disposed on a first film surface, and a second electrode part disposed on a second film surface. The first film surface is one main surface of the first film. And the second film surface is another main surface of the first film or a main surface of the second film facing the another main surface. Each of the first electrode part and the second electrode part includes an aluminum-containing layer. The first film surface has a first non-electrode part on which the first electrode part is not disposed. The first non-electrode part extends along a longitudinal direction of the first film surface, and splits the first electrode part into two parts in a width direction perpendicular to the longitudinal direction of the first film surface. The second film surface has second non-electrode parts on which the second electrode part is not disposed. The second non-electrode part extends along a longitudinal direction of the second film surface, and is disposed at each of both end portions in a width direction perpendicular to the longitudinal direction of the second film surface. A first region having a light transmittance ranging from 30% to 80%, inclusive, is disposed between the first electrode part and the first non-electrode part. A width of the first region is less than or equal to 0.5 mm in the width direction of the first film surface. A second region having a light transmittance ranging from 30% to 80%, inclusive, is disposed between the second electrode part and the second non-electrode part. A width of the second region is less than or equal to 0.5 mm in the width direction of the second film surface.

According to the present disclosure, it is possible to provide the film capacitor that decrease in capacitance due to oxidation of the electrode parts is less likely to occur.

Effects or meanings of the present disclosure are further clarified in the following description of exemplary embodiments. However, the exemplary embodiments shown below are merely examples of implementing the present disclosure, and the present disclosure is not at all limited to the examples described in the following exemplary embodiments.

DETAILED DESCRIPTION OF EMBODIMENT

Figure 1A:
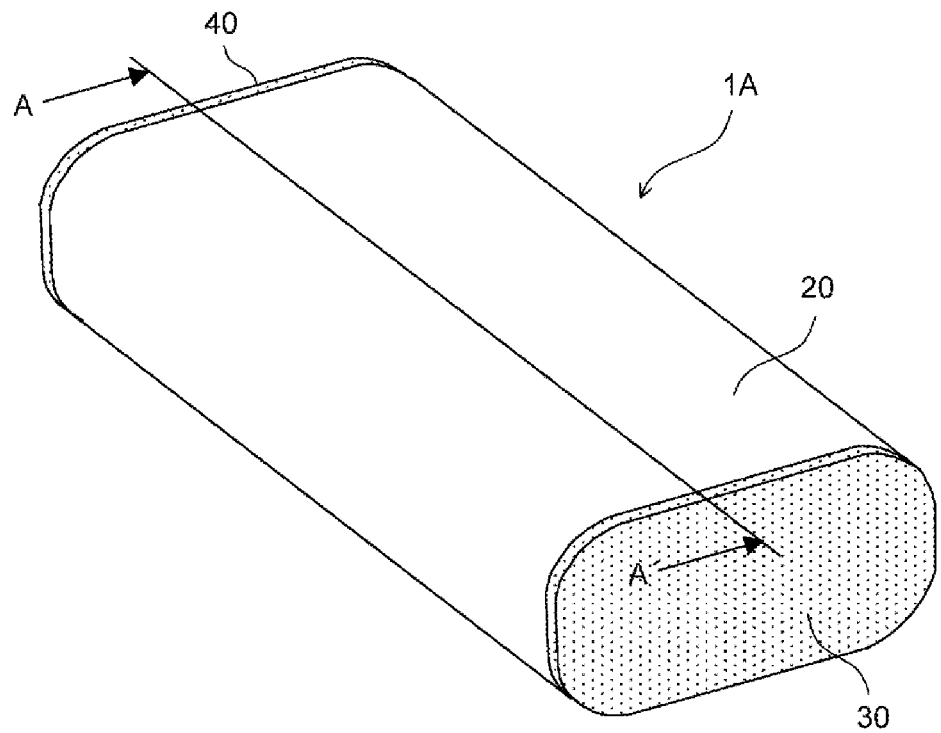
FIG. 1A is a perspective view illustrating a film capacitor according to a first exemplary embodiment.

Conventionally, oil is applied to a non-electrode part which is wide and continuously extends in the longitudinal direction of the film (the central insulating margin part and the end insulating margin parts in a film capacitor of Unexamined Japanese Patent Publication No. 2014-067793) by an oil spraying method. This is because the oil spraying method can supply a large amount of oil when a large amount of oil is required for providing the non-electrode portion that is wide. Further, by the oil spraying method, the non-electrode portion can be continuously formed in the longitudinal direction of the film by moving the position of the nozzle along the film.

However, since vaporized oil by the oil spraying method as described above is applied to the wide non-electrode portion extending continuously in the longitudinal direction, a contour of the non-electrode portion formed by the oil is not clear. Thus, after the deposition electrode is formed on the film, the boundary between the non-electrode portion and the deposition electrode portion adjacent to the non-electrode portion is likely to be unclear.

On the other hand, in the oil printing method, the contour of the non-electrode portion due to the oil becomes clear because the relief parts onto which the oil has been transferred is brought into contact with the film. However, since the oil printing method supply a small amount of oil, the oil is likely to be blurred when it is used for the wide non-electrode portion. Thus, conventionally, the oil printing method is not used for applying the oil to the wide non-electrode portion although it is used for applying the oil to a narrow non-electrode portion, such as the winding-direction insulating margin part and the width-direction insulating margin parts in the film capacitor of Unexamined Japanese Patent Publication No. 2014-067793.

In a film capacitor, aluminum, which has excellent moisture resistance, is widely used as the deposition electrode. When aluminum is used as the deposition electrode, electric field concentration is likely to occur at the boundary between the deposition electrode portion and the non-electrode portion when a voltage is applied to the film capacitor. Thus, an oxidization of the deposition electrode is likely to occur at the boundary. In particular, when the boundary between the deposition electrode portion and the non-electrode portion is unclear as described above, the unclear portion becomes a starting point for the oxidization, and the oxidation of the deposition electrode is more likely to occur. Hence, in such a film capacitor, there may be a problem that capacitance is likely to decrease due to the oxidation of the deposition electrode during long time use.

The present disclosure provides the film capacitor that decrease in capacitance due to oxidation of the electrode parts can be less likely to occur.

Exemplary embodiments of the present disclosure are described below with reference to the drawings.

First Exemplary Embodiment

First, film capacitor 1A according to the first exemplary embodiment is described.

In the present exemplary embodiment, main surface 100a corresponds to a "first film surface" described in the claims. Central insulating margin part 101 corresponds to a "first non-electrode part" described in the claims. Furthermore, main surface 200a corresponds to a "second film surface" described in the claims. End insulating margin part 201 corresponds to a "second non-electrode part" described in the claims. First deposition electrode 300 corresponds to a "first electrode part" described in the claims. Second deposition electrode 400 corresponds to a "second electrode part" described in the claims.

However, the above description is only intended to define correspondences between components in the claims and components in the exemplary embodiment. The correspondences described above do not limit the scope of the disclosure in the claims to the components described in the exemplary embodiment.

Figure 1B:
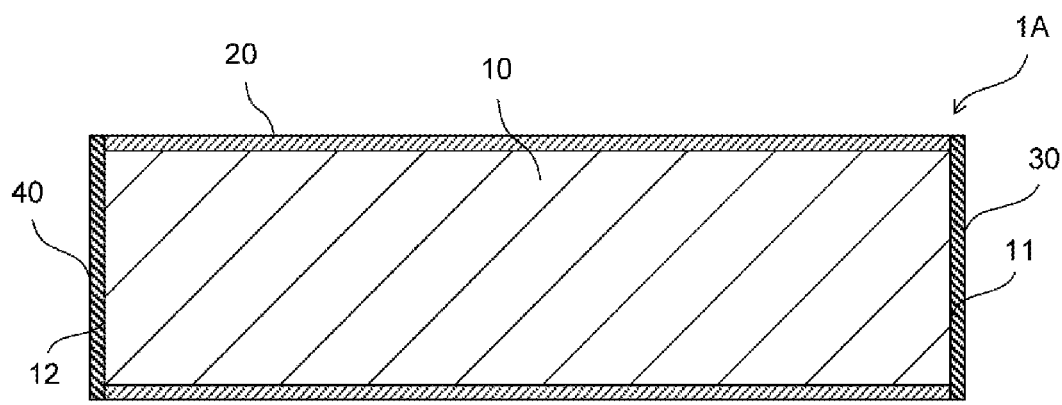
FIG. 1B is a vertical sectional view illustrating the film capacitor according to the first exemplary embodiment taken along line A-A' in FIG. 1A.

FIG. 1A is a perspective view illustrating film capacitor 1A according to the first exemplary embodiment and FIG. 1B is a vertical sectional view illustrating film capacitor 1A according to the first exemplary embodiment taken along line A-A' in FIG. 1A.

Film capacitor 1A includes capacitor body 10, exterior film 20, first end-face electrode 30, and second end-face electrode 40. Film capacitor 1A is formed into a flat columnar shape having an oval shape in section.

Capacitor body 10 is formed by winding two dielectric films in a stacked state, on which deposition electrodes are respectively formed. Film capacitor 1A, i.e., capacitor body 10 employs a configuration having two capacitors connected in series. The configuration of capacitor body 10 is described in detail later.

Exterior film 20 is wound around an outer peripheral surface of capacitor body 10 a plurality of times (a plurality of turns). In this way, the outer peripheral surface of capacitor body 10 is covered with exterior film 20 that has a plurality of layers, which prevents scratching, damaging, and the like of capacitor body 10. Examples of a material for exterior film 20 include polypropylene (PP), polyethylene terephthalate (PET), and polyethylene naphthalate (PEN).

First end-face electrode 30 and second end-face electrode 40 are respectively formed by thermally spraying metal such as aluminum, zinc, or magnesium onto first end face 11 and second end face 12 of capacitor body 10. A lead-out terminal (not shown) such as a bus bar or lead wire for drawing out electricity from film capacitor 1A is connected to each of first end-face electrode 30 and second end-face electrode 40.

The configuration of capacitor body 10 is described in detail next.

Figure 2A:
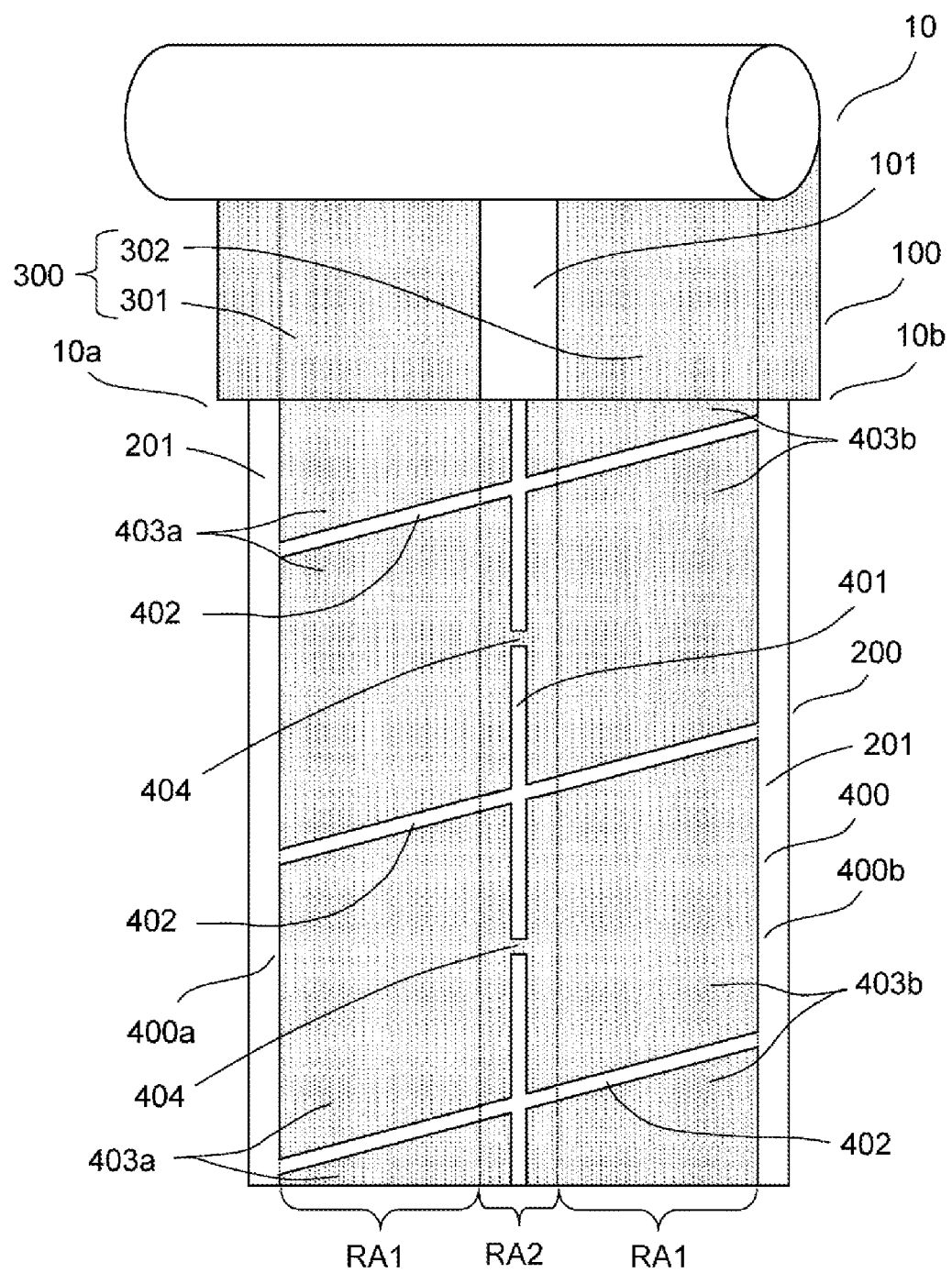
FIG. 2A is a plan view illustrating a capacitor body according to the first exemplary embodiment with a first film and a second film partly wound.
Figure 2B:
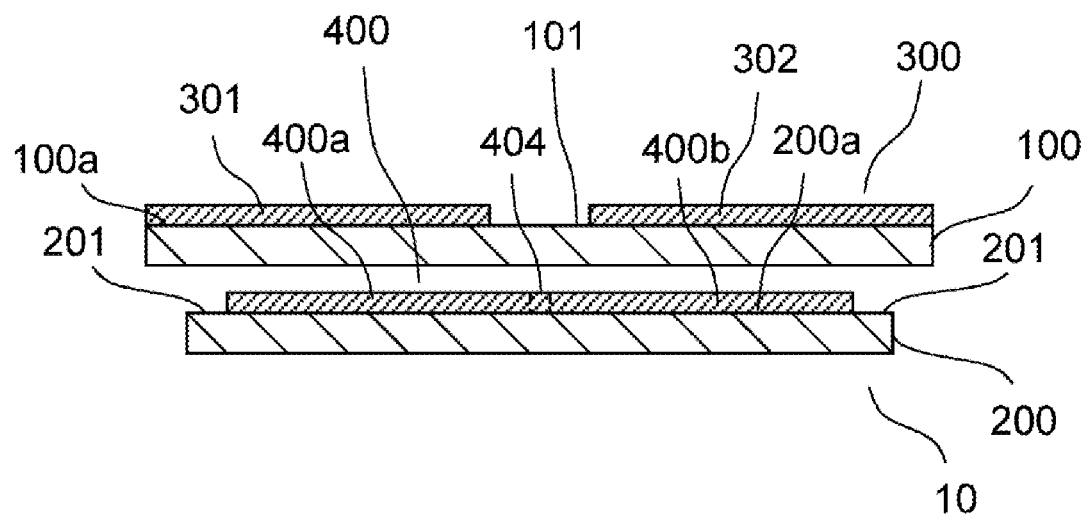
FIG. 2B is a sectional view illustrating the capacitor body according to the first exemplary embodiment taken in a width direction at a portion with a fuse pattern.
Figure 2C:
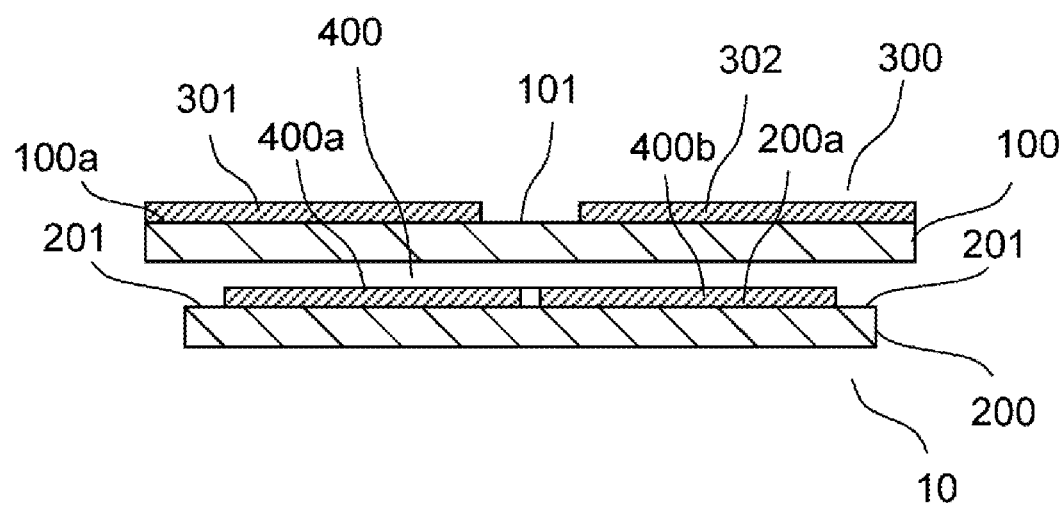
FIG. 2C is a sectional view illustrating the capacitor body according to the first exemplary embodiment taken in the width direction at a portion without a fuse pattern.

FIG. 2A is a plan view illustrating capacitor body 10 according to the first exemplary embodiment with first film 100 and second film 200 partly wound. FIG. 2B is a sectional view illustrating capacitor body 10 according to the first exemplary embodiment taken in a width direction at a portion with fuse pattern 404 and FIG. 2C is a sectional view illustrating capacitor body 10 according to the first exemplary embodiment taken in the width direction at a portion without fuse pattern 404.

Capacitor body 10 includes first film 100, second film 200, first deposition electrode 300, and second deposition electrode 400.

First film 100 and second film 200 are wound in a stacked state such that first film 100 is located inside (on an upper side) and second film 200 is located outside (on a lower side). First film 100 and second film 200 are transparent dielectric films made of a resin material such as polypropylene (PP), polyethylene terephthalate (PET), and polyethylene naphthalate (PEN). First film 100 has a larger width dimension than second film 200. Central insulating margin part 101 is formed at a center in a width direction of first film 100 in such manner as to continuously extend without being interrupted in a longitudinal direction of first film 100. End insulating margin part 201 is formed at each of both ends in a width direction of second film 200 in such manner as to continuously extend without being interrupted in a longitudinal direction of second film 200. Central insulating margin part 101 and end insulating margin parts 201 are margin parts where no metal is deposited, that is, aluminum-containing layer is not deposited.

First deposition electrode 300, which is an aluminum-containing layer, is formed on one (upper) main surface 100a of first film 100. The aluminum-containing layer is formed by deposition of, for example, aluminum, or an alloy of aluminum and a metal such as magnesium. Preferably, the metal alloyed with aluminum does not include zinc. First deposition electrode 300 is split into first continuous electrode 301 and second continuous electrode 302 in the width direction of first deposition electrode 300 by central insulating margin part 101. First continuous electrode 301 and second continuous electrode 302 are formed so as to be continuous without being separated in the longitudinal direction of first film 100. First continuous electrode 301 is formed to one end in the width direction of first film 100 to be connected to first end-face electrode 30. Second continuous electrode 302 is formed to the other end in the width direction of first film 100 to be connected to second end-face electrode 40.

Second deposition electrode 400, which is an aluminum-containing layer similar to first deposition electrode 300, is formed on one (upper) main surface 200a of second film 200 facing the other (lower) main surface of first film 100. Second deposition electrode 400 is formed between end insulating margin parts 201 that are respectively disposed at the both ends of second film 200.

At a center in a width direction of second deposition electrode 400, longitudinal slit part 401 extending in a longitudinal direction of second deposition electrode 400 is formed. Width-direction slit part 402 extending across second deposition electrode 400 in the width direction of second deposition electrode 400 is formed. A plurality of width-direction slit parts 402 are arranged at predetermined intervals in the longitudinal direction of second deposition electrode 400. Each of width-direction slit parts 402 is formed to extend from end insulating margin part 201 at one end to end insulating margin part 201 at the other end such that each of width-direction slit parts 402 is inclined with respect to the width direction.

A width of end insulating margin part 201 is much larger than a width of longitudinal slit part 401 or a width of width-direction slit part 402. A width of central insulating margin part 101 is substantially equal to the sum of the widths of two end insulating margin parts 201 and the width of longitudinal slit part 401.

Second deposition electrode 400 is separated by longitudinal slit part 401 into first one-side electrode 400a and second one-side electrode 400b in the width direction. First one-side electrode 400a and second one-side electrode 400b are respectively divided by width-direction slit parts 402 into a plurality of first divided electrodes 403a and a plurality of second divided electrodes 403b in longitudinal directions of the electrodes.

First continuous electrode 301 and first one-side electrode 400a form first capacitor 10a, and second continuous electrode 302 and second one-side electrode 400b form second capacitor 10b. Second capacitor 10b is connected in series to first capacitor 10a.

In capacitor body 10, there are effective electrode regions RA1 and ineffective electrode region RA2. Effective electrode regions RA1 are regions where first deposition electrode 300, which are first continuous electrode 301 and second continuous electrode 302, and second deposition electrode 400 overlap each other. And ineffective electrode region RA2 is a region other than effective electrode regions RA1 which is displaced from effective electrode regions RA1 in the width direction of first deposition electrode 300 and second deposition electrode 400. In other words, ineffective electrode region RA2 is a region where second deposition electrode 400 and central insulating margin part 101 of first film 100 overlap each other.

Longitudinal slit part 401 overlaps central insulating margin part 101. In other words, longitudinal slit part 401 is provided in ineffective electrode region RA2. Thus, in second deposition electrode 400, ineffective electrode region RA2 includes a portion of first one-side electrode 400a and a portion of second one-side electrode 400b which are close to longitudinal slit part 401 and overlap central insulating margin part 101. Meanwhile, effective electrode regions RA1 include a portion of first one-side electrode 400a which overlaps first continuous electrode 301 and a portion of second one-side electrode 400b which overlaps second continuous electrode 302. Effective electrode region RA1 formed by first continuous electrode 301 and first one-side electrode 400a contributes to a capacitance of first capacitor 10a, and effective electrode region RA1 formed by second continuous electrode 302 and second one-side electrode 400b contributes to a capacitance of second capacitor 10b.

Fuse pattern 404 is formed between each of first divided electrodes 403a and each of second divided electrodes 403b so as to bridge across longitudinal slit part 401. In other words, in second deposition electrode 400, longitudinal slit part 401 is interrupted over distances corresponding to respective widths of fuse patterns 404. A pattern width of each of fuse patterns 404 is set to about 0.5 mm, for example.

In a manufacturing process of film capacitor 1A, first deposition electrode 300 and second deposition electrode 400 are respectively formed by deposition on first film 100 and second film 200 by use of deposition apparatus 1000 such as a vacuum deposition apparatus.

Figure 3A:
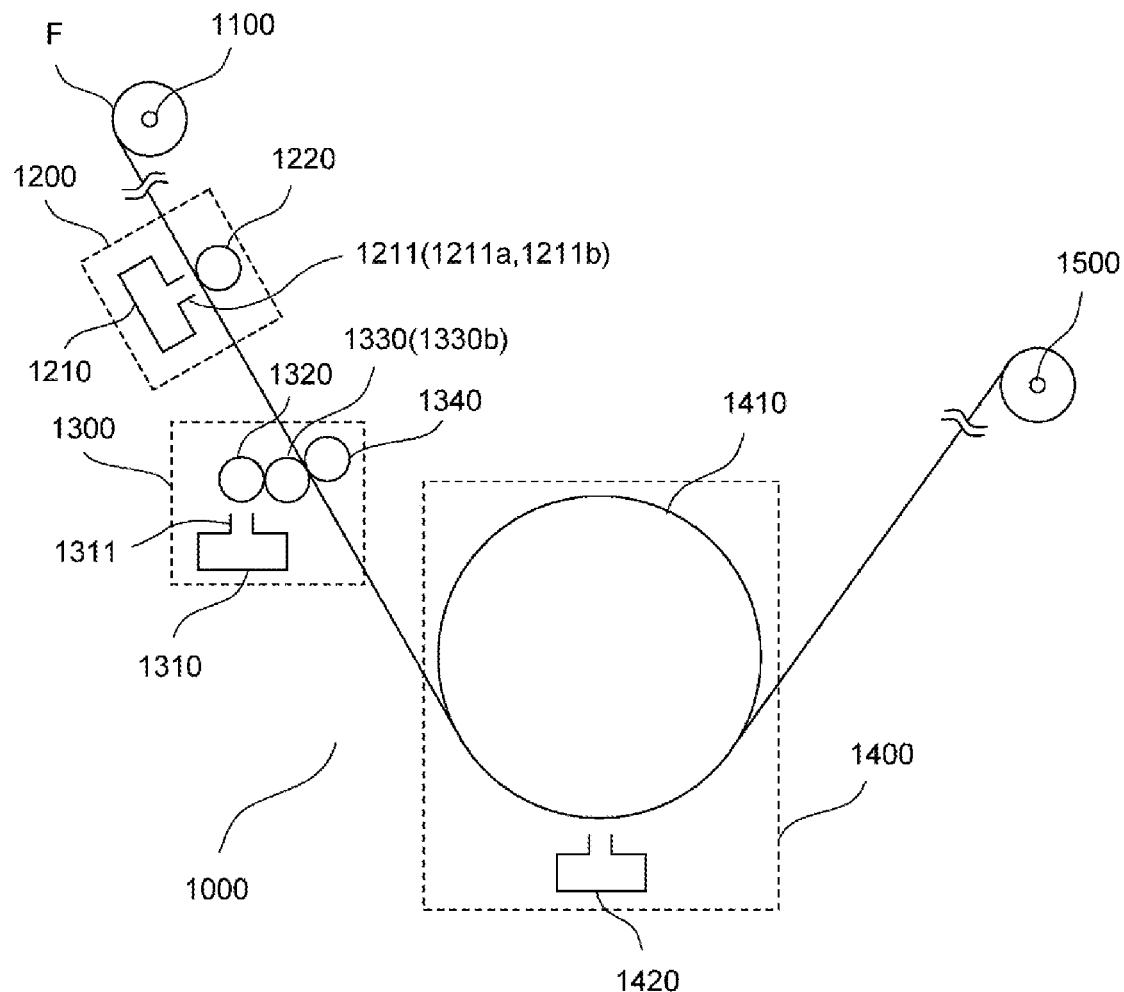
FIG. 3A is a view illustrating a deposition apparatus according to the first exemplary embodiment.
Figure 3B:
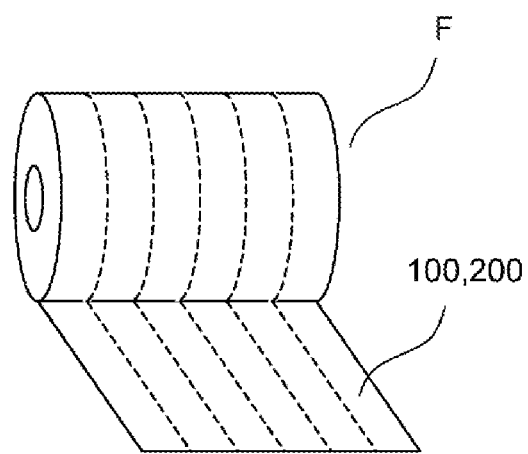
FIG. 3B is a perspective view illustrating a roll of raw film according to the first exemplary embodiment.

FIG. 3A is a view illustrating deposition apparatus 1000 according to the first exemplary embodiment and FIG. 3B is a perspective view illustrating a roll of raw film F according to the first exemplary embodiment.

Deposition apparatus 1000 includes unwinder 1100, oil spray unit 1200, oil printing unit 1300, electrode deposition unit 1400, and winder 1500.

The roll of raw film F for forming first films 100 or second films 200 is set on unwinder 1100. As shown by broken lines in FIG. 3B, raw film F is cut into the plurality of films in a width direction after formation of the deposition electrodes (first deposition electrodes 300, second deposition electrodes 400) by deposition apparatus 1000 and the respective cut films become first films 100 or second films 200.

Oil spray unit 1200 includes oil tank 1210 and backup roll 1220. Oil tank 1210 has replaceable nozzle 1211, and sprays oil from nozzle 1211 by vaporizing the oil stored in oil tank 1210. Oil is sprayed onto a front surface of raw film F that is conveyed in oil spray unit 1200. Backup roll 1220 has a cylindrical shape and is disposed at a position facing nozzle 1211 so as to be in contact with a back surface of raw film F. In the present exemplary embodiment, nozzle 1211 includes first nozzle 1211a used for forming, by deposition, first deposition electrodes 300 on raw film F for forming first films 100 and second nozzle 1211b used for forming, by deposition, second deposition electrodes 400 on raw film F for forming second films 200.

Oil printing unit 1300 includes oil tank 1310, transfer roll 1320, printing roll 1330, and backup roll 1340. Oil tank 1310 spouts oil from nozzle 1311 by vaporizing the oil stored in oil tank 1310. Transfer roll 1320 and printing roll 1330 each have cylindrical shape. Transfer roll 1320 rotates while allowing the spouted oil to adhere to a peripheral surface of transfer roll 1320. Relief parts having predetermined pattern shapes are formed on a peripheral surface of printing roll 1330. The peripheral surface of printing roll 1330 and the peripheral surface of transfer roll 1320 come into contact with each other and the oil transferred from transfer roll 1320 adheres to the relief parts. Printing roll 1330 rotates in synchronization with conveyance of raw film F and the front surface of raw film F comes into contact with the relief parts of printing roll 1330. In this way, the pattern shapes of the relief parts are printed on the front surface of raw film F by use of the oil. Backup roll 1340 has a cylindrical shape, is disposed to face printing roll 1330, and comes into contact with the back surface of raw film F. In the present exemplary embodiment, printing roll 1330 includes second printing roll 1330b used for forming, by deposition, second deposition electrodes 400 on raw film F for forming second films 200.

Electrode deposition unit 1400 includes cooling roll 1410 and deposition device 1420. Cooling roll 1410, which is made of metallic material and formed in a cylindrical shape, has a cooling mechanism inside cooling roll 1410. Raw film F is wound around cooling roll 1410 and cooled. Deposition device 1420 deposits metal including aluminum on the front surface of raw film F cooled by cooling roll 1410. In this way, the deposition electrodes (first deposition electrodes 300, second deposition electrodes 400) are formed in regions of raw film F which are not applied with the oil.

Raw film F on which deposition electrodes are formed is taken up by winder 1500.

Figure 4:
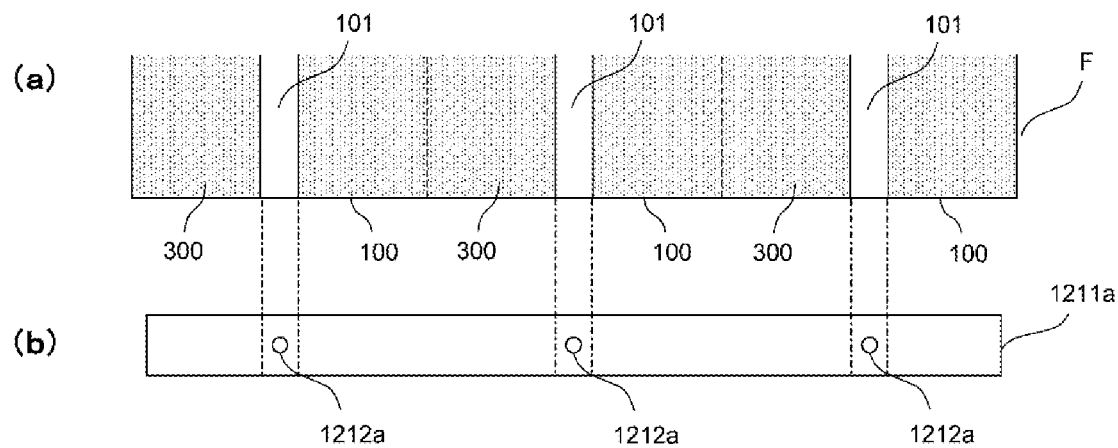
FIG. 4 is a view for explaining a configuration of a first nozzle according to the first exemplary embodiment.

FIG. 4 is a view for explaining a configuration of first nozzle 1211a according to the first exemplary embodiment.

Part (a) of FIG. 4 is a view of a portion of raw film F on which first deposition electrodes 300 are formed and part (b) of FIG. 4 is a front view of first nozzle 1211a. FIG. 4 shows a configuration example in a case where raw film F will be cut into three first films 100 in the width direction.

In first nozzle 1211a, nozzle holes 1212a are formed at positions respectively corresponding to three central insulating margin parts 101 formed on raw film F. From respective nozzle holes 1212a, the vaporized oil is sprayed. As for first nozzle 1211a, a distance from each nozzle hole 1212a to raw film F and a spray angle of each nozzle hole 1212a are set such that a spray width on the front surface of raw film F becomes equal to a width of each central insulating margin part 101.

If the number of films into which raw film F will be cut changes, the number of nozzle holes 1212a of first nozzle 1211a is changed accordingly.

Figure 5:
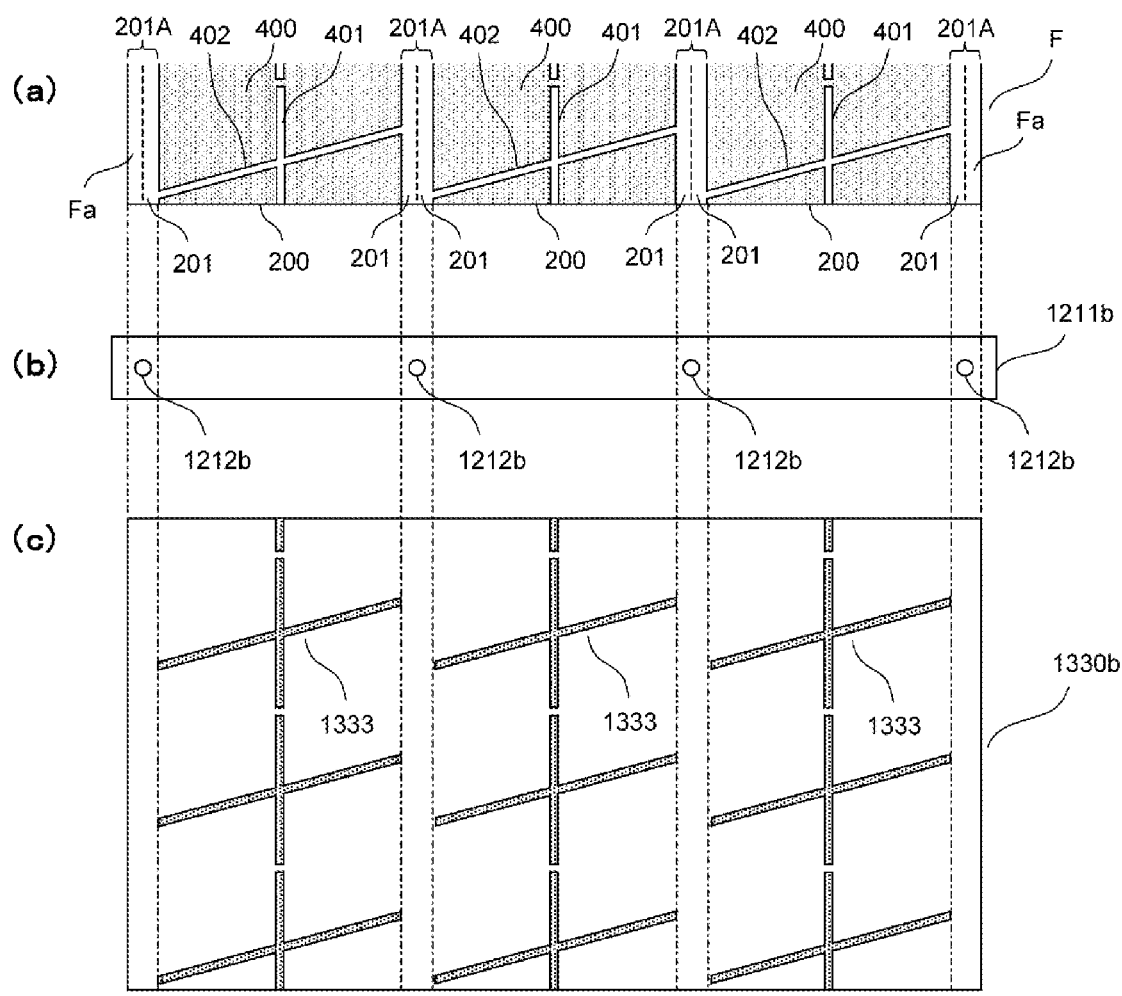
FIG. 5 is a view for explaining configurations of a second nozzle and a second printing roll according to the first exemplary embodiment.

FIG. 5 is a view for explaining configurations of second nozzle 1211b and second printing roll 1330b according to the first exemplary embodiment. Part (a) of FIG. 5 is a view of a portion of raw film F on which second deposition electrodes 400 are formed and parts (b) and (c) of FIG. 5 are a front view of second nozzle 1211b and a developed view of a peripheral surface of second printing roll 1330b, respectively. FIG. 5 shows a configuration example in a case where raw film F will be cut into three second films 200 in the width direction.

Each of two combined margin parts 201A which are positioned closer to a central portion of raw film F is constituted by two end insulating margin parts 201 adjacent to each other. Each of two combined margin parts 201A which are respectively positioned at left end and right end of raw film F is constituted by end insulating margin part 201 and spare margin part Fa. Spare margin part Fa has the same width as that of end insulating margin part 201. Thus, combined margin part 201A positioned at end of raw film has a configuration similar to that of combined margin part 201A positioned closer to the central portion.

In second nozzle 1211b, nozzle holes 1212b are formed at positions respectively corresponding to four combined margin parts 201A formed on raw film F. From respective nozzle holes 1212b, the vaporized oil is sprayed. As for second nozzle 1211b, a distance from each nozzle hole 1212b to raw film F and a spray angle of each nozzle hole 1212b are set such that a spray width on the front surface of raw film F becomes equal to the width of each of combined margin parts 201A.

Second printing roll 1330b includes three second relief parts 1333 disposed on a peripheral surface of second printing roll 1330b. Second relief part 1333 is formed to slightly protrude with respect to the peripheral surface. Second relief part 1333 has pattern shapes corresponding to longitudinal slit parts 401 and width-direction slit parts 402.

If the number of films into which raw film F will be cut changes, the number of nozzle holes 1212b of second nozzle 1211b and the number of second relief parts 1333 on second printing roll 1330b are changed accordingly.

Next, a deposition electrode forming step by use of deposition apparatus 1000 is described. The oil has been applied, as a masking agent, to regions of raw film F where the deposition electrodes are not formed by oil spray unit 1200 and oil printing unit 1300. After this step, in the deposition electrode forming step, deposition electrodes are formed on raw film F by electrode deposition unit 1400.

Figure 6A:
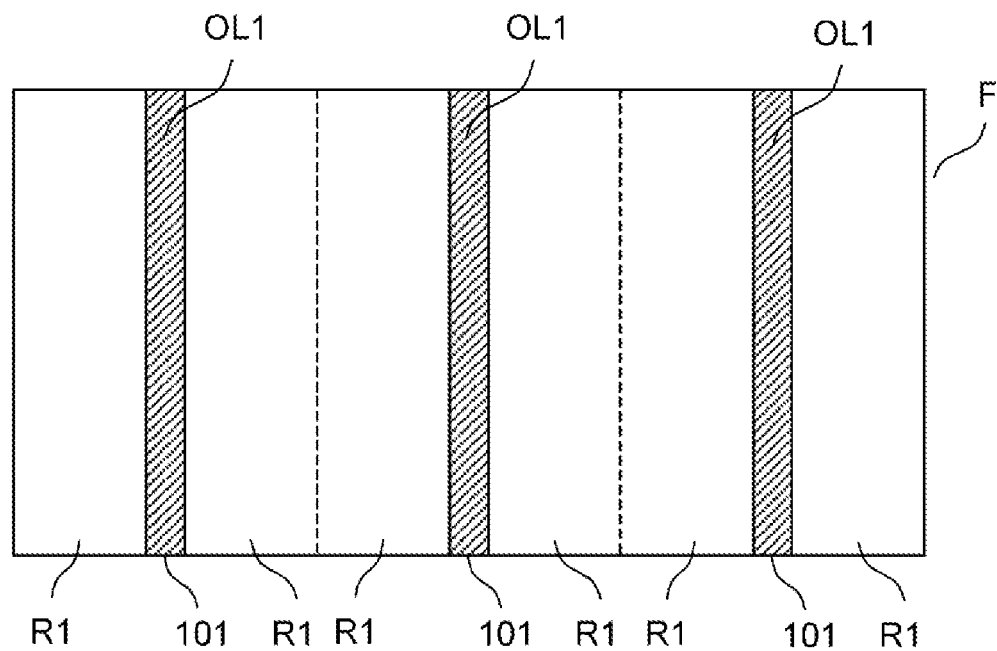
FIGS. 6A to 6C are views for explaining a process flow of treatments of the raw film on which first deposition electrodes are formed and which is split into the plurality of first films according to the first exemplary embodiment.
Figure 6B:
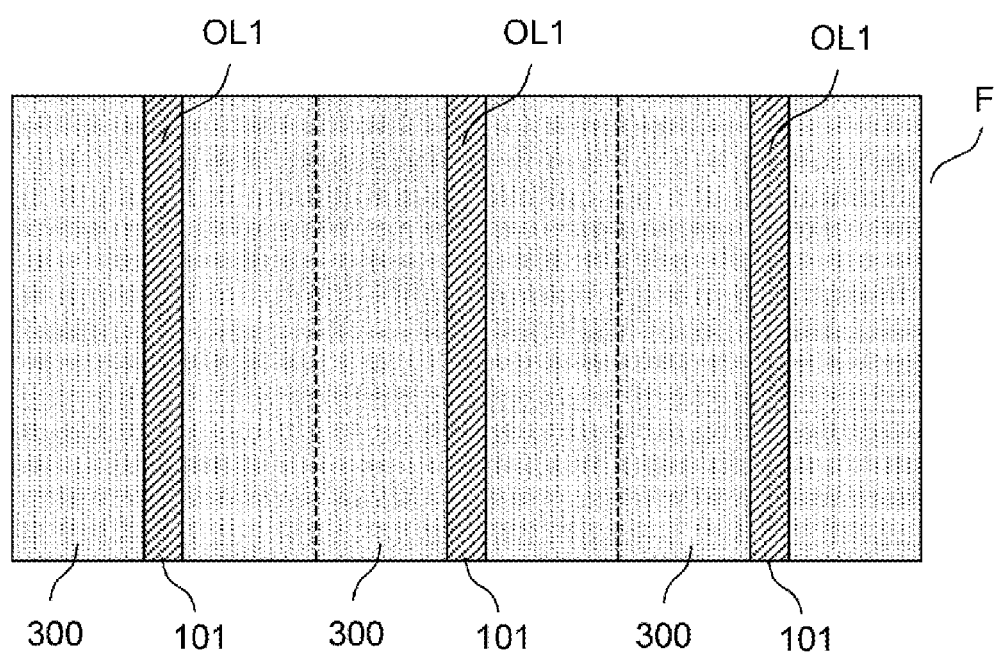
Figure 6C:
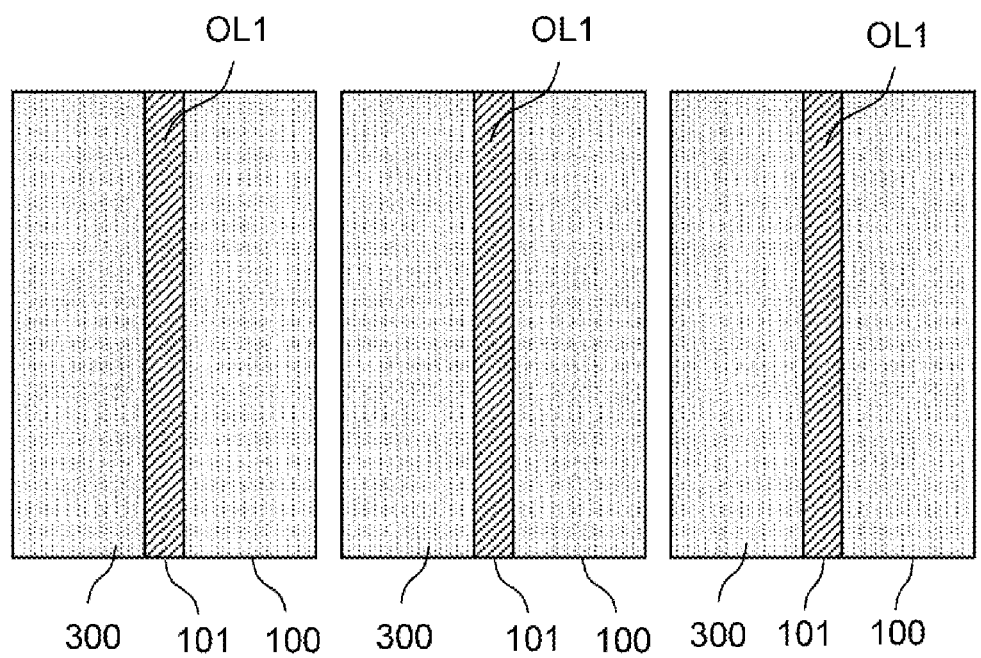

FIGS. 6A to 6C are views for explaining a process flow of treatments of raw film F on which first deposition electrodes 300 are formed and which is cut into the plurality of first films 100 according to the first exemplary embodiment.

When first deposition electrodes 300 are formed on raw film F by deposition, first nozzle 1211a is set on oil tank 1210 of oil spray unit 1200.

In oil spray unit 1200, the vaporized oil is continuously sprayed from first nozzle 1211a. When raw film F passes through oil spray unit 1200, i.e., passes first nozzle 1211a, oil OL1 from first nozzle 1211a is applied to entire regions corresponding to respective central insulating margin parts 101 of raw film F as shown in FIG. 6A. At this time, oil OL1 is sprayed, i.e., applied in a non-contact manner to raw film F. By adjusting conditions such as viscosity, temperature, spray amount, and spray pressure of oil OL1, it is possible to form clear outlines of end portions of central insulating margin parts 101 formed by oil OL1. Thus, clear boundaries between central insulating margin parts 101 and electrode forming regions R1 where first deposition electrodes 300 are formed.

Then, when raw film F passes through electrode deposition unit 1400, first deposition electrodes 300 are formed in the regions of raw film F which are not applied with oil OL1, i.e., electrode forming regions R1 as shown in FIG. 6B.

Then, raw film F taken up by winder 1500 is detached from winder 1500 and cut to split in the width direction. In this way, respective first films 100 on which first deposition electrodes 300 are formed are completed as shown in FIG. 6C. Oil OL1 remains as it is on first film 100. Oil OL1 is transparent.

FIGS. 7A to 7D are views for explaining a process flow of treatments of raw film F on which second deposition electrodes 400 are formed and which is cut into the plurality of second films 200 according to the first exemplary embodiment.

When second deposition electrodes 400 are formed on raw film F by deposition, second nozzle 1211b is set on oil tank 1210 of oil spray unit 1200 and second printing roll 1330b is set in oil printing unit 1300.

Figure 7A:
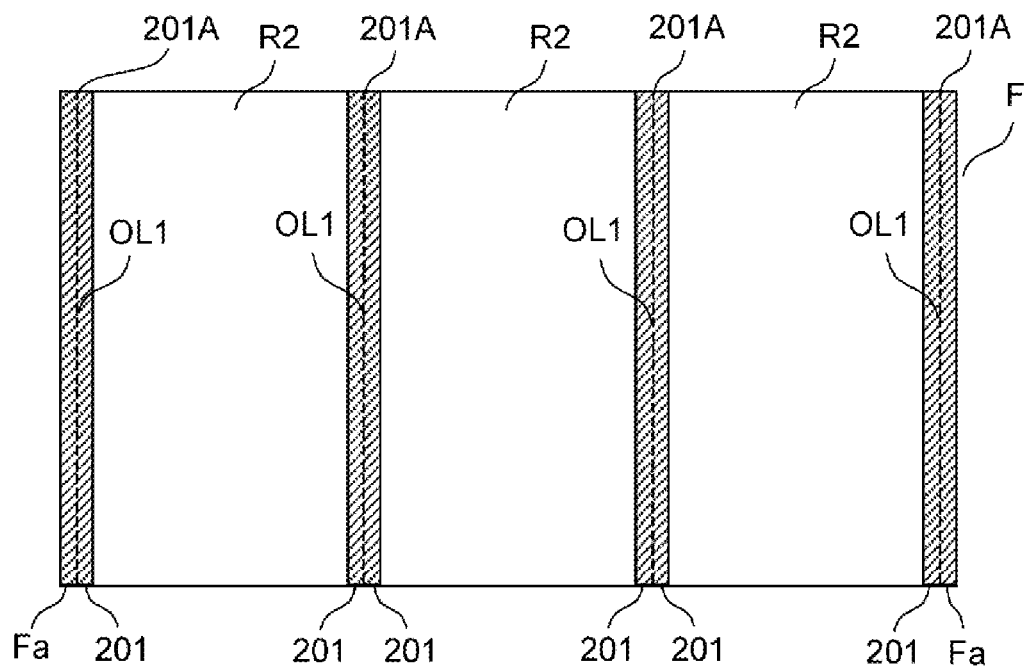
FIGS. 7A to 7D are views for explaining a process flow of treatments of the raw film on which second deposition electrodes are formed and which is split into the plurality of second films according to the first exemplary embodiment.
Figure 7B:
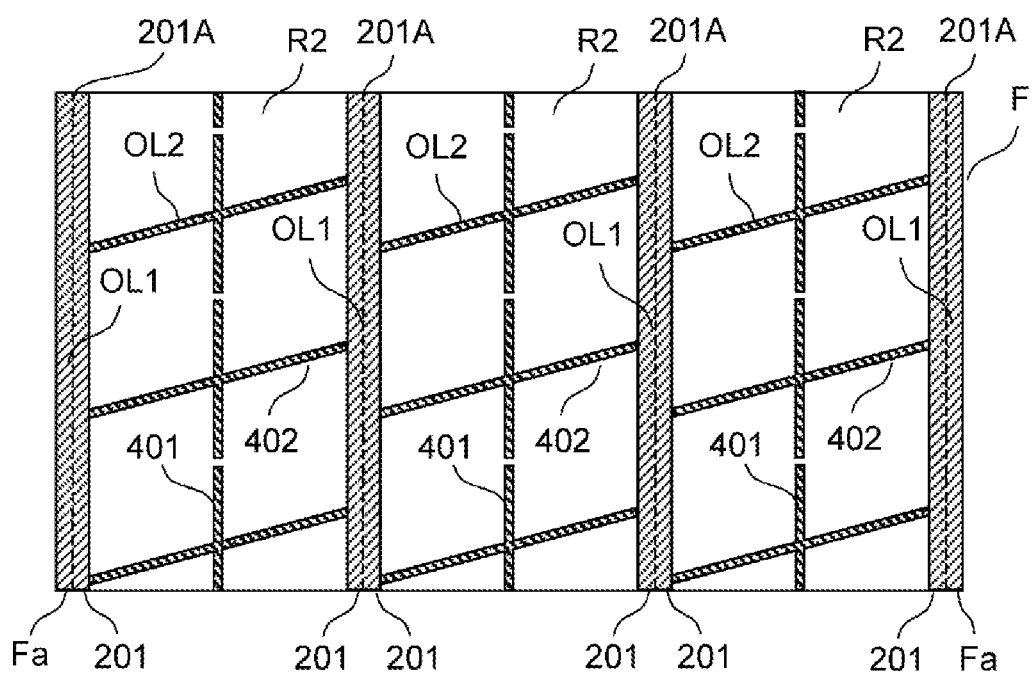
Figure 7C:
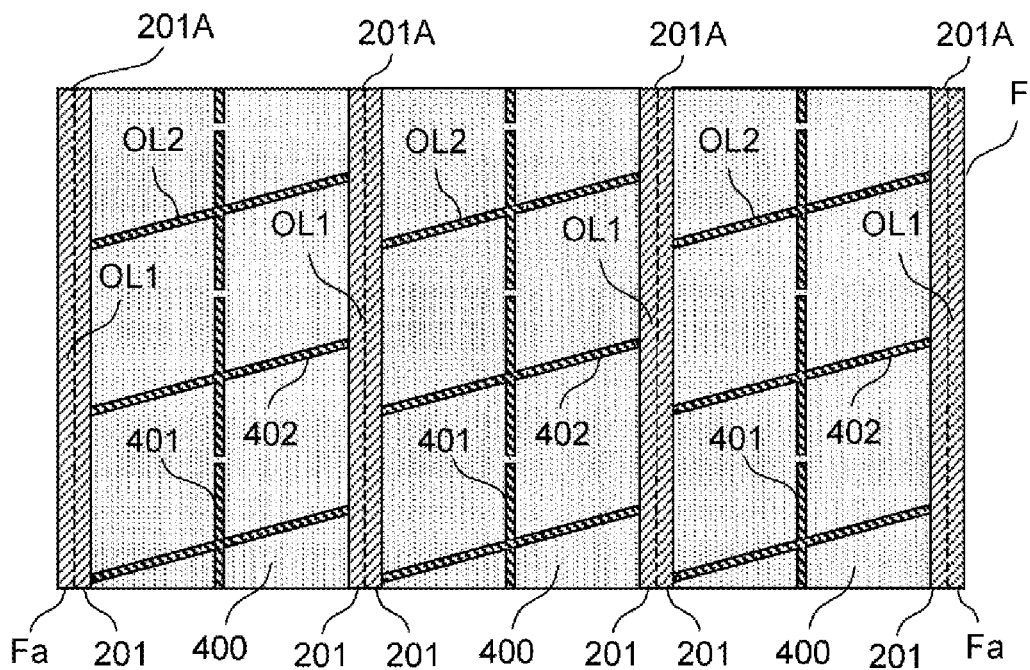
Figure 7D:
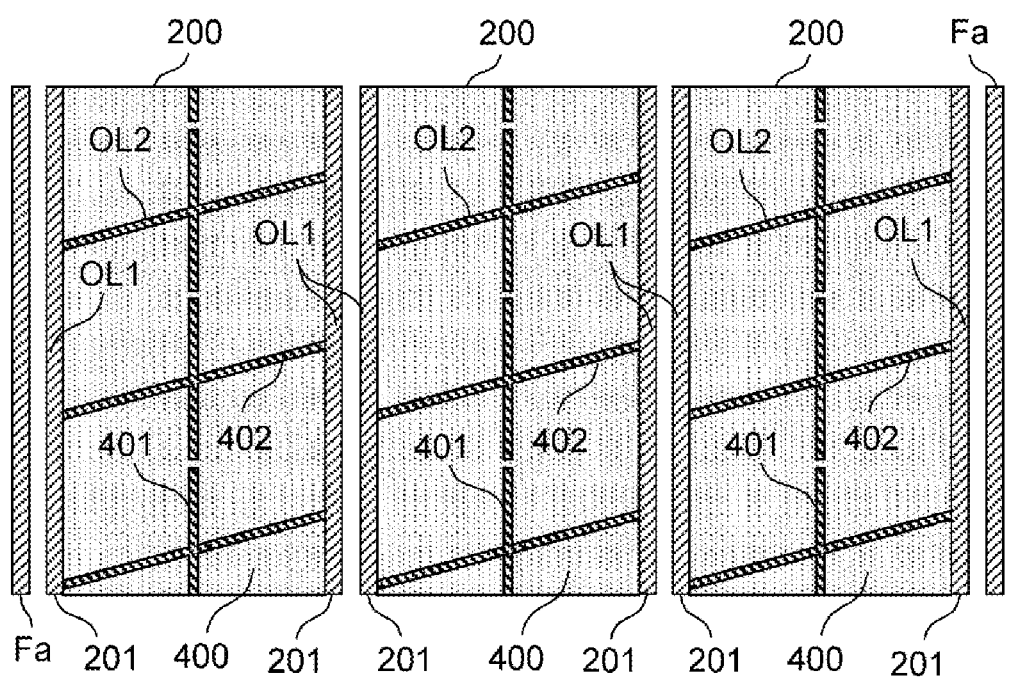

When raw film F passes through oil spray unit 1200, i.e., passes second nozzle 1211b, oil OL1 from second nozzle 1211b is applied to entire regions corresponding to respective combined margin parts 201A, i.e., respective end insulating margin parts 201 of raw film F as shown in FIG. 7A. Then, when raw film F passes through oil printing unit 1300, i.e., passes second printing roll 1330b, second relief parts 1333 come in contact with the front surface of raw film F. Thus, oil OL2 on second relief parts 1333 is transferred, and oil OL2 is applied to positions corresponding to longitudinal slit parts 401 and width-direction slit parts 402 as shown in FIG. 7B. Then when raw film F passes through electrode deposition unit 1400, second deposition electrodes 400 are formed in the regions of raw film F which are not applied with oil OL1, OL2 as shown in FIG. 7C. Then, when raw film F is cut to split in the width direction and spare margin parts Fa are removed, respective second films 200 on which second deposition electrodes 400 are formed are completed as shown in FIG. 7D. Each of oil OL1, OL2 remains as it is on second film 200.

Similar to the case for first film 100, in second film 200, by adjusting conditions such as viscosity, temperature, spray amount, and spray pressure of oil OL1, it is possible to form clear outlines of end portions of end insulating margin parts 201 formed by oil OL1. Thus, clear boundaries between end insulating margin parts 201 and electrode forming regions R2 where second deposition electrodes 400 are formed.

Figure 8A:
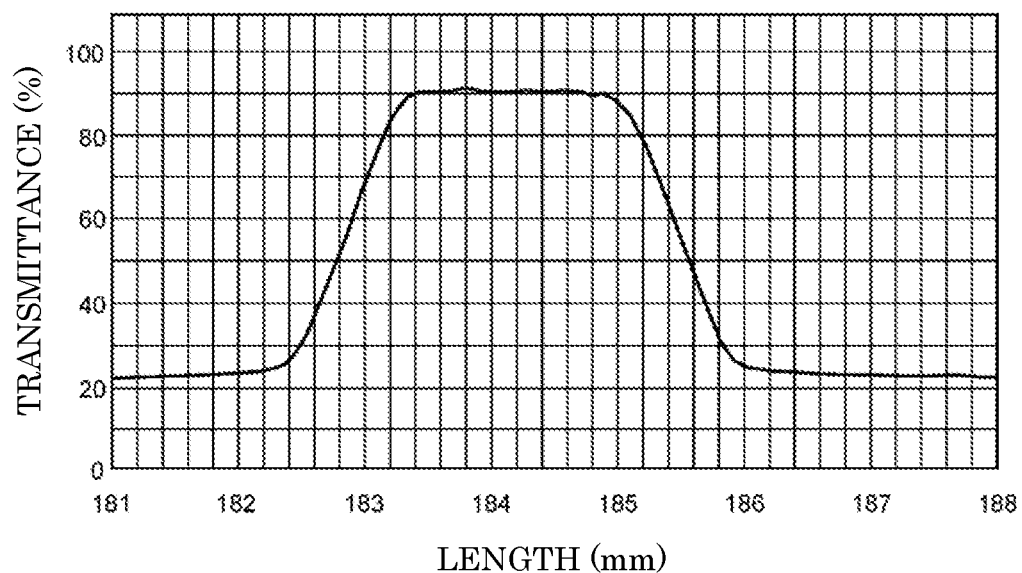
FIG. 8A is a graph showing a result of measurement of a light transmittance of a region including a central insulating margin part of a first film (raw film) on which a first deposition electrode is formed in a prior-art deposition electrode forming step.

FIG. 8A is a graph showing a result of measurement of a light transmittance of a region including central insulating margin part 101 of first film 100 (raw film F) on which first deposition electrode 300 is formed in a prior-art deposition electrode forming step. And FIG. 8B is a graph showing a result of measurement of a light transmittance of a region including central insulating margin part 101 of first film 100 (raw film F) on which first deposition electrode 300 is formed in the deposition electrode forming step according to the first exemplary embodiment.

The transmittance was measured by use of IB-01, a laser thru-beam sensor manufactured by Keyence, as a measuring instrument under measurement conditions of a laser wavelength of 660 nm and a spot diameter of ϕ1.0 mm.

Figure 8B:
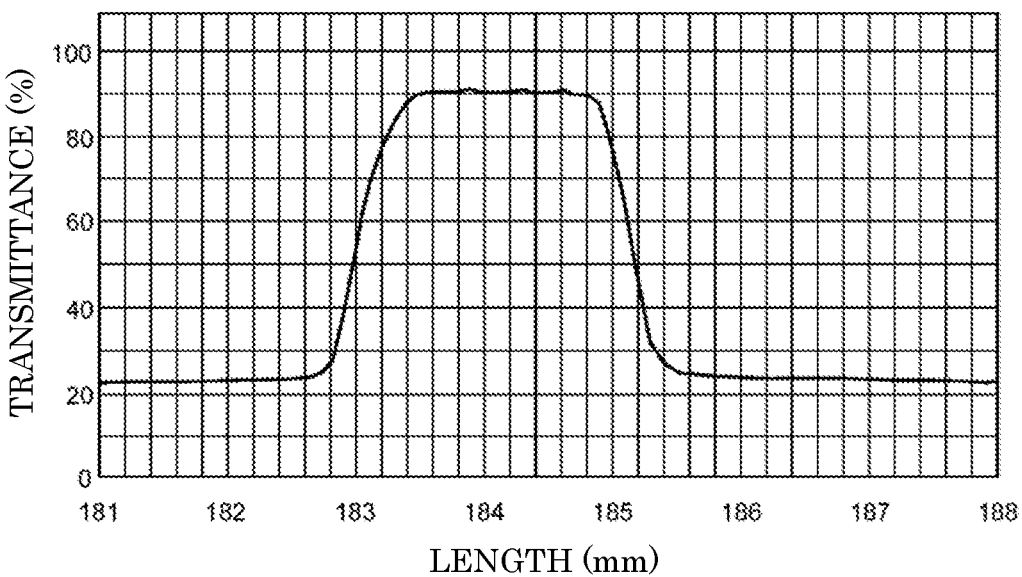
FIG. 8B is a graph showing a result of measurement of a light transmittance of a region including a central insulating margin part of the first film (raw film) on which the first deposition electrode is formed in a deposition electrode forming step according to the first exemplary embodiment.

In each of FIGS. 8A and 8B, central insulating margin part 101 is included in a region having a transmittance higher than 80% and first deposition electrode 300 is included in regions having a transmittance lower than 30%. As the boundaries between first deposition electrode 300 and central insulating margin part 101 become unclear (i.e., end faces of first deposition electrode 300 become blurrier (less sharp)), regions having a transmittance ranging from 30% to 80%, inclusive, (hereinafter referred to as "intermediate regions") become large.

As shown in FIG. 8A, as for first film 100 on which first deposition electrode 300 was formed by the prior-art deposition electrode forming step, a length of the left intermediate region was about 0.7 mm and a length of the right intermediate region was about 0.6 mm. On the other hand, as shown in FIG. 8B, as for first film 100 on which first deposition electrode 300 was formed by the deposition electrode forming step according to the present exemplary embodiment, the boundaries between first deposition electrode 300 and central insulating margin part 101 became clear. Specifically, a length of the left intermediate region was about 0.4 mm and a length of the right intermediate region was about 0.3 mm, which showed a substantial decrease in the lengths of the intermediate regions.

As described above, as for first film 100 in film capacitor 1A according to the present exemplary embodiment, it is possible to make the lengths of the regions having the light transmittance ranging from 30% to 80%, inclusive, less than or equal to 0.5 mm in the boundaries between first deposition electrode 300 and central insulating margin part 101 even if some errors occur. In the same way, as for second film 200 in film capacitor 1A according to the present exemplary embodiment, it is possible to make lengths of regions having a light transmittance ranging from 30% to 80%, inclusive, less than or equal to 0.5 mm in the boundaries between second deposition electrode 400 and end insulating margin parts 201.

Figure 9A:
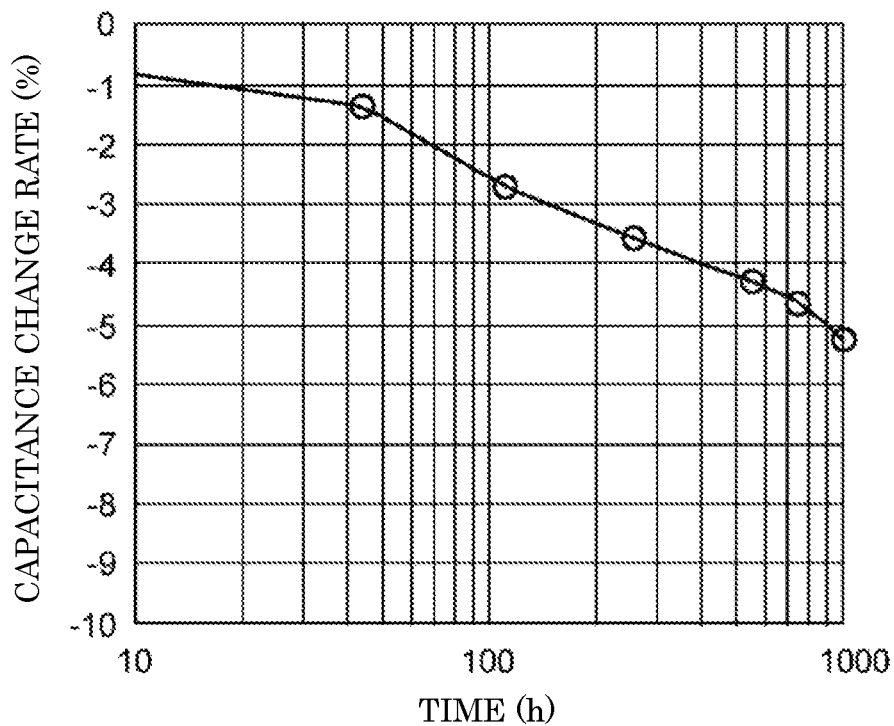
FIG. 9A is a graph showing a result of measurement of a capacitance change rate in a high-temperature load test on a prior-art film capacitor.
Figure 9B:
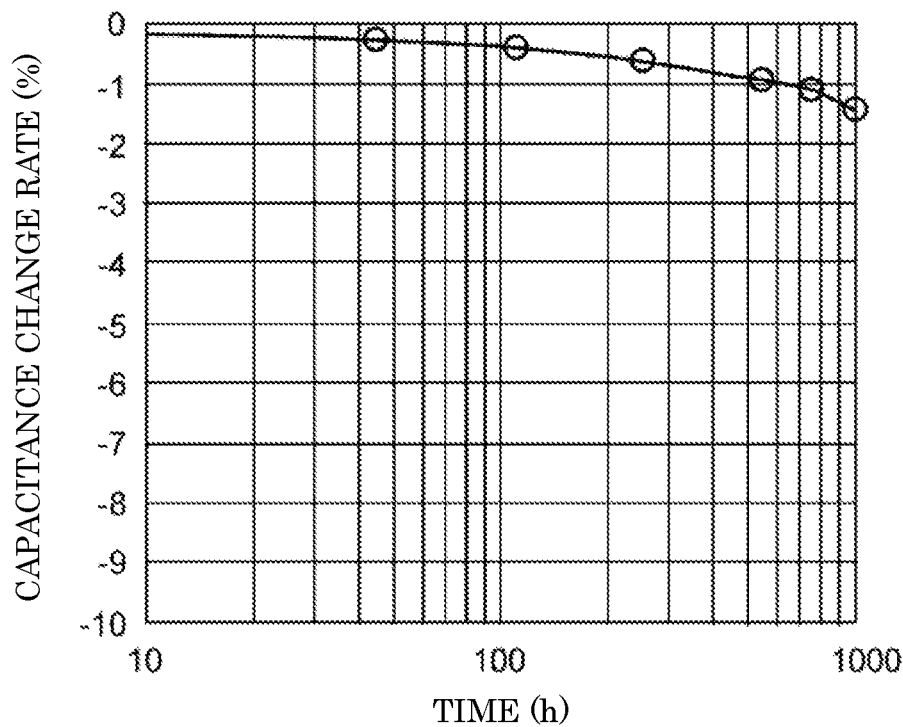
FIG. 9B is a graph showing a result of measurement of a capacitance change rate in a high-temperature load test on the film capacitor according to the first exemplary embodiment.

FIG. 9A is a graph showing a result of measurement of a capacitance change rate in a high-temperature load test on a prior-art film capacitor and FIG. 9B is a graph showing a result of measurement of a capacitance change rate in a high-temperature load test on film capacitor 1A according to the first exemplary embodiment. The prior-art film capacitor includes first deposition electrode 300 and second deposition electrode 400 formed by the prior-art deposition electrode forming step.

As for test conditions, an ambient temperature was 85° C., an applied voltage was AC (Alternating Current) 475 V, and an application time was 1000 hours. The capacitance change rate is expressed by (a−b)b×100(%) (a capacitance after the test: a (μF), an initial capacitance: b (μF)).

As shown in FIG. 9A, the capacitance change rate after the lapse of 1000 hours was about −5.0% in the case of the prior-art film capacitor. On the other hand, in the case of film capacitor 1A according to the present exemplary embodiment, the capacitance change rate after the lapse of 1000 hours was about −1.5%, which means that the capacitance change rate decreased substantially. This is considered to be because occurrence of oxidation at the end portions of first deposition electrode 300 and the end portions of second deposition electrode 400 during the application of the voltage is suppressed due to the clear boundaries between first deposition electrode 300 and central insulating margin part 101 on first film 100 and the clear boundaries between second deposition electrode 400 and end insulating margin parts 201 on second film 200.

<Effects of First Exemplary Embodiment>

According to the present exemplary embodiment, it is possible to form the clear boundaries between first deposition electrode 300 and central insulating margin part 101 on first film 100 to thereby make the lengths of the regions having the light transmittance ranging from 30% to 80%, inclusive, less than or equal to 0.5 mm in the boundaries. Similarly, it is possible to form the clear boundaries between second deposition electrode 400 and end insulating margin parts 201 on second film 200 to thereby make the lengths of the regions having the light transmittance ranging from 30% to 80%, inclusive, less than or equal to 0.5 mm in the boundaries. As a result, it is possible to substantially decrease the capacitance change rate of film capacitor 1A after long-term use. For example, a conventional standard of the capacitance change rate is about ±7%, and film capacitor 1A can meet a capacitance change rate of ±3% that is a higher standard less than or equal to a half of the conventional standard.

Second Exemplary Embodiment

Next, film capacitor 1B according to the second exemplary embodiment is described.

In the present exemplary embodiment, main surface 500a corresponds to a "first film surface" described in the claims. First insulating margin part 501 corresponds to a "first non-electrode part" described in the claims. Furthermore, main surface 600a corresponds to a "second film surface" described in the claims. Second insulating margin part 601 corresponds to a "second non-electrode part" described in the claims. First deposition electrode 700 corresponds to a "first electrode part" described in the claims. Second deposition electrode 800 corresponds to a "second electrode part" described in the claims.

However, the above description is only intended to define correspondences between components in the claims and components in the exemplary embodiment. The correspondences described above do not limit the scope of the disclosure in the claims to the components described in the exemplary embodiment.

Figure 10A:
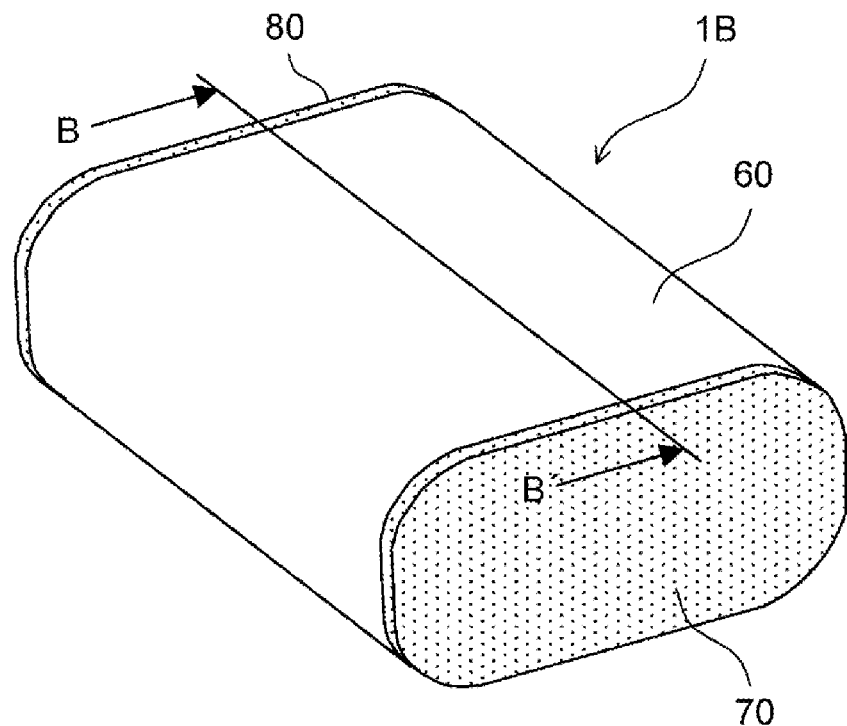
FIG. 10A is a perspective view illustrating a film capacitor according to a second exemplary embodiment.
Figure 10B:
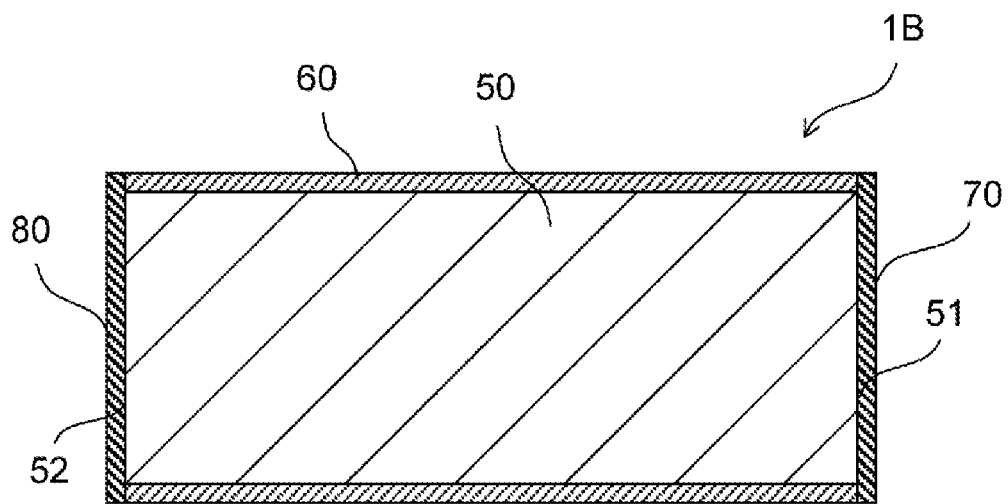
FIG. 10B is a vertical sectional view illustrating the film capacitor according to the second exemplary embodiment taken along line B-B' in FIG. 10A.

FIG. 10A is a perspective view illustrating film capacitor 1B according to the second exemplary embodiment and FIG. 10B is a vertical sectional view illustrating film capacitor 1B according to the second exemplary embodiment taken along line B-B' in FIG. 10A.

Film capacitor 1B includes capacitor body 50, exterior film 60, first end-face electrode 70, and second end-face electrode 80. Configurations of exterior film 60, first end-face electrode 70, and second end-face electrode 80 are similar to the configurations of exterior film 20, first end-face electrode 30, and second end-face electrode 40 of film capacitor 1A according to the first exemplary embodiment. Since film capacitor 1B, i.e., capacitor body 50 has a configuration formed by one capacitor, a width between first end face 51 and second end face 52 of capacitor body 50 is smaller than a width between first end face 11 and second end face 12 of capacitor body 10 of film capacitor 1A according to the first exemplary embodiment.

Figure 11A:
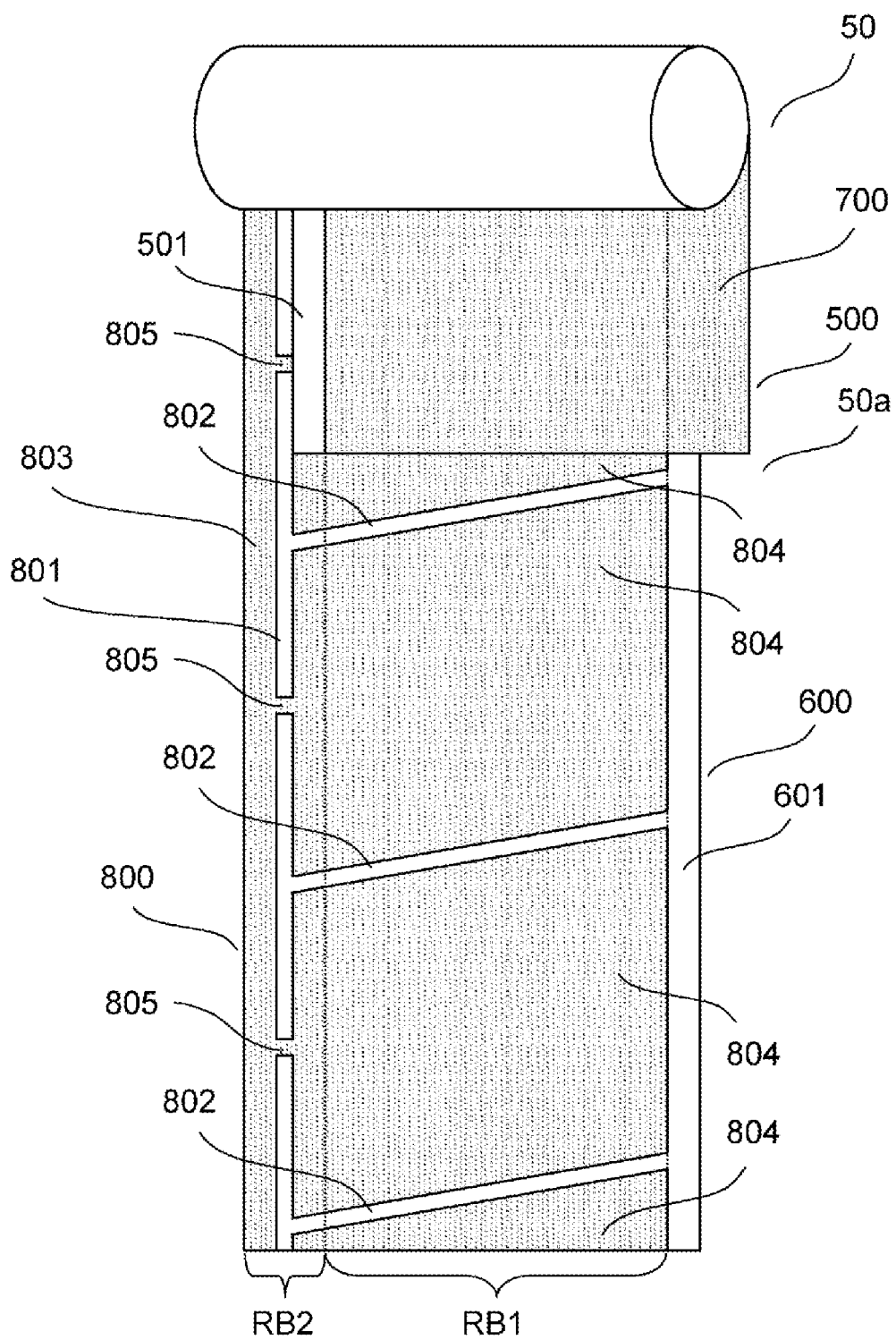
FIG. 11A is a plan view illustrating a capacitor body according to the second exemplary embodiment with a first film and a second film partly wound.
Figure 11B:
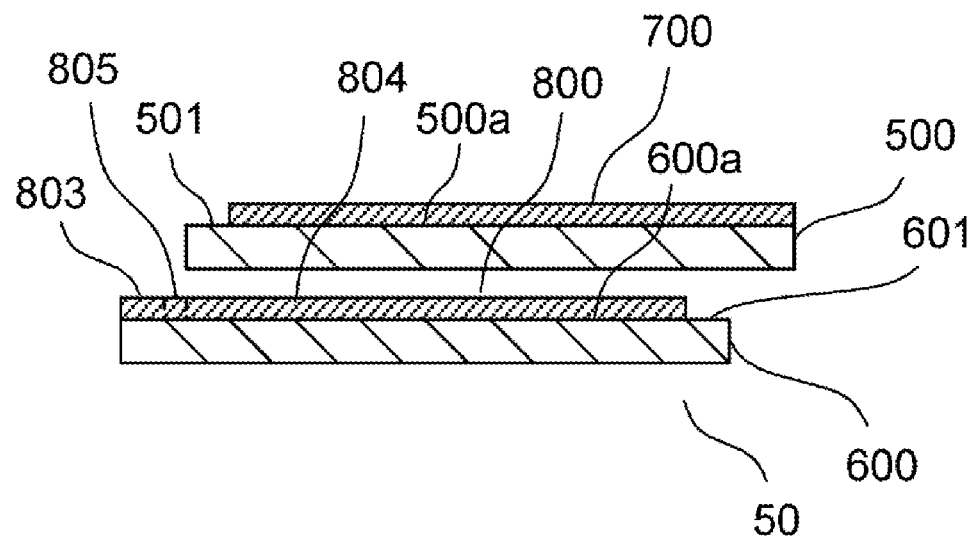
FIG. 11B is a sectional view illustrating the capacitor body according to the second exemplary embodiment taken in a width direction at a portion with a fuse pattern.
Figure 11C:
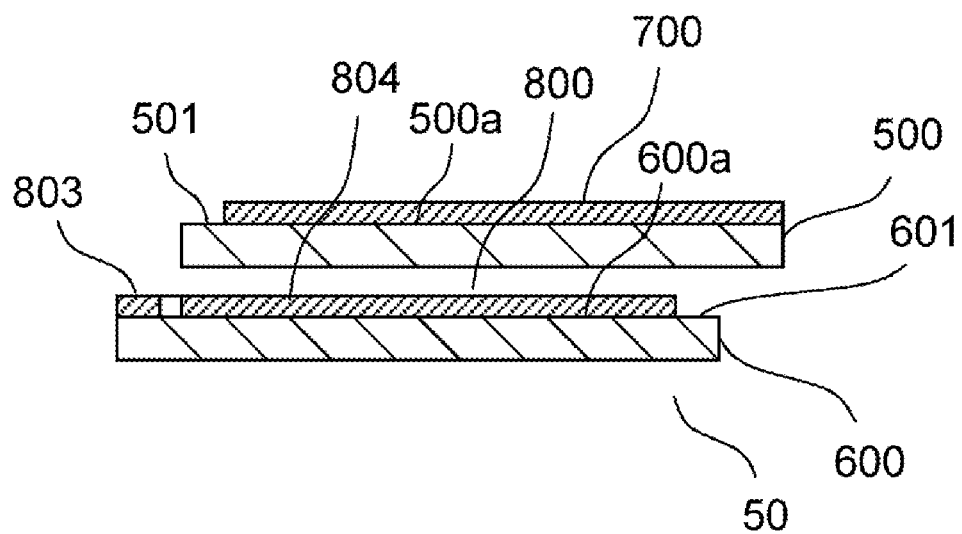
FIG. 11C is a sectional view illustrating the capacitor body according to the second exemplary embodiment taken in the width direction at a portion without the fuse pattern.

FIG. 11A is a plan view illustrating capacitor body 50 according to the second exemplary embodiment with first film 500 and second film 600 partly wound. FIG. 11B is a sectional view illustrating capacitor body 50 according to the second exemplary embodiment taken in a width direction at a portion with fuse pattern 805 and FIG. 11C is a sectional view illustrating capacitor body 50 according to the second exemplary embodiment taken in the width direction at a portion without fuse pattern 805.

Capacitor body 50 includes first film 500, second film 600, first deposition electrode 700, and second deposition electrode 800.

First film 500 and second film 600 are wound in a stacked state such that first film 500 is located inside (on an upper side) and second film 600 is located outside (on a lower side). First film 500 and second film 600 are transparent dielectric films made of resin material such as polypropylene (PP), polyethylene terephthalate (PET), polyethylene naphthalate (PEN), and the like. First film 500 and second film 600 have almost the same width dimension. First insulating margin part 501 is formed on one end in a width direction of first film 500 so as to continuously extend without being interrupted in a longitudinal direction of first film 500. Second insulating margin part 601 is formed on an end of second film 600 at an side opposite to the one end of first film 500 in a width direction of second film 600 so as to continuously extend without being interrupted in a longitudinal direction of second film 600. First insulating margin part 501 and second insulating margin part 601 are margin parts where no metal is deposited, that is, aluminum-containing layer is not deposited.

First deposition electrode 700, which is an aluminum-containing layer, is formed on one (upper) main surface 500a of first film 500. The aluminum-containing layer is formed by deposition of aluminum or an alloy of aluminum and metal such as magnesium, for example. Preferably, the metal alloyed with aluminum does not include zinc. First deposition electrode 700 is formed so as to be continuous without being separated in the longitudinal direction of first film 500. First deposition electrode 700 is formed to the other end in the width direction of first film 500 to be connected to second end-face electrode 80.

Second deposition electrode 800, which is an aluminum-containing layer similar to first deposition electrode 700, is formed on one (upper) main surface 600a of second film 600 facing the other (lower) main surface of first film 500. Second deposition electrode 800 is formed so as to reach an end of second film 600 at a side opposite to second insulating margin part 601 in the width direction to be connected to first end-face electrode 70.

Longitudinal slit part 801 extending in a longitudinal direction of second deposition electrode 800 is formed near an end portion of second deposition electrode 800 which is connected to first end-face electrode 70. Width-direction slit part 802 extending across second deposition electrode 800 in a width direction of second deposition electrode 800 is formed. A plurality of width-direction slit parts 802 are arranged at predetermined intervals in the longitudinal direction. Each of width-direction slit parts 802 is formed to extend from longitudinal slit part 801 to second insulating margin part 601 such that each of width-direction slit parts 802 is inclined with respect to the width direction. Second deposition electrode 800 is separated by longitudinal slit part 801 and the plurality of width-direction slit parts 802. Thus, second deposition electrode 800 is constituted by common electrode 803 extending in the longitudinal direction of second deposition electrode 800 and a plurality of divided electrodes 804 arranged in the longitudinal direction of second deposition electrode 800. Common electrode 803 is connected to first end-face electrode 70.

A width of each of first insulating margin part 501 and second insulating margin part 601 is much larger than a width of each of longitudinal slit part 801 and width-direction slit parts 802.

Capacitor 50a is formed by first deposition electrode 700 and respective divided electrodes 804 facing first deposition electrode 700.

In capacitor body 50, there are effective electrode region RB1 and ineffective electrode region RB2. Effective electrode region RB1 is a region where first deposition electrode 700 and second deposition electrode 800 overlap each other. And ineffective electrode region RB2 is a region other than effective electrode regions RB1 which is displaced from effective electrode region RB1 in the width direction of first deposition electrode 700 and second deposition electrode 800.

Longitudinal slit part 801 is provided in ineffective electrode region RB2. Therefore, in second deposition electrode 800, each of divided electrodes 804 includes a part which is close to longitudinal slit part 801 and is in ineffective electrode region RB2. A part which overlaps first deposition electrode 700 in each of divided electrodes 804 is included in effective electrode region RB1. Effective electrode region RB1 contributes to a capacitance of capacitor 50a.

Fuse pattern 805 is formed between each of divided electrodes 804 and common electrode 803 so as to bridge across longitudinal slit part 801. A pattern width of each of fuse patterns 805 is set to about 0.5 mm, for example.

In a manufacturing process of film capacitor 1B, first deposition electrode 700 and second deposition electrode 800 are respectively formed by deposition on first film 500 and second film 600 by use of deposition apparatus 1000 similarly to film capacitor 1A.

When first deposition electrodes 700 are formed on raw film F by deposition, third nozzle 1211c is set on oil tank 1210 of oil spray unit 1200. When second deposition electrodes 800 are formed on raw film F by deposition, fourth nozzle 1211d is set on oil tank 1210 of oil spray unit 1200 and fourth printing roll 1330d is set in oil printing unit 1300.

Figure 12:
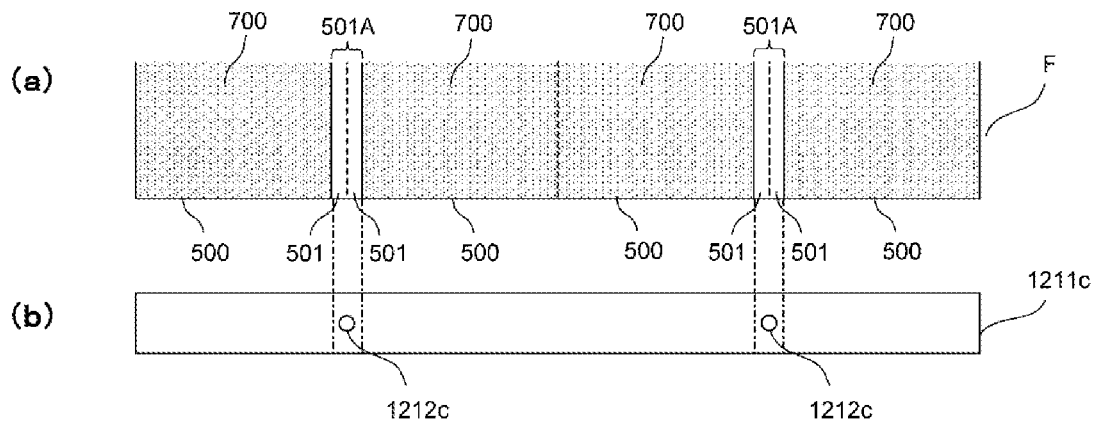
FIG. 12 is a view for explaining a configuration of a third nozzle according to the second exemplary embodiment.

FIG. 12 is a view for explaining a configuration of third nozzle 1211c according to the second exemplary embodiment. Part (a) of FIG. 12 is a view of a portion of raw film F on which first deposition electrodes 700 are formed and part (b) of FIG. 12 is a front view of third nozzle 1211c. FIG. 12 shows a configuration example in a case where raw film F will be cut into four first films 500 in a width direction.

First films 500 having opposite orientations in a longitudinal direction are alternately arranged in the width direction of raw film F. In this way, combined margin part 501A is formed by two first insulating margin parts 501 adjacent to each other.

In third nozzle 1211c, nozzle holes 1212c are formed at positions respectively corresponding to two combined margin parts 501A formed on raw film F. From respective nozzle holes 1212c, the vaporized oil is sprayed. As for third nozzle 1211c, a distance from each nozzle hole 1212c to raw film F and a spray angle of each nozzle hole 1212c are set such that a spray width on a front surface of raw film F becomes equal to a width of each combined margin part 501A.

Figure 13:
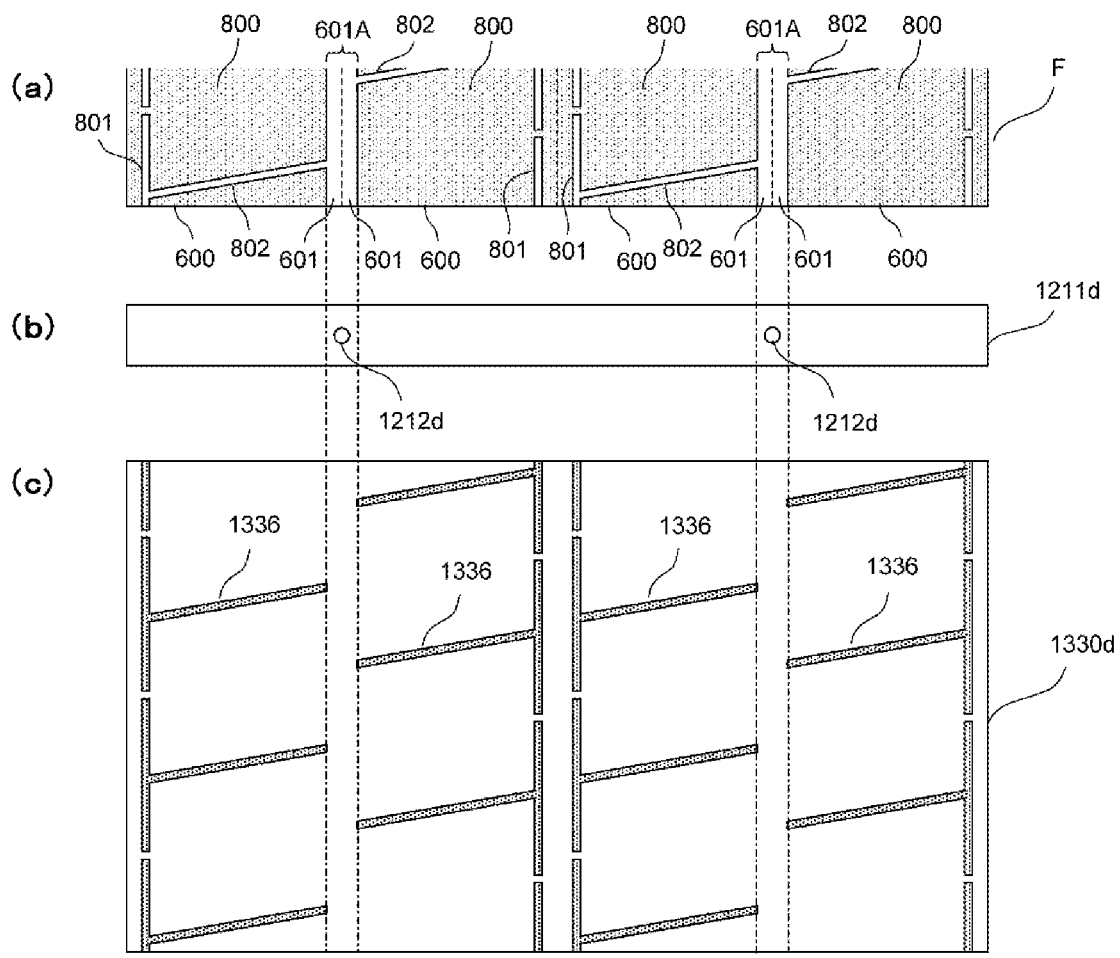
FIG. 13 is a view for explaining configurations of a fourth nozzle and a fourth printing roll according to the second exemplary embodiment.

FIG. 13 is a view for explaining configurations of fourth nozzle 1211d and fourth printing roll 1330d according to the second exemplary embodiment. Part (a) of FIG. 13 is a view of a portion of raw film F on which second deposition electrodes 800 are formed and parts (b) and (c) of FIG. 13 are a front view of fourth nozzle 1211d and a developed view of a peripheral surface of fourth printing roll 1330d, respectively. FIG. 13 shows a configuration example in a case where raw film F will be cut into four second films 600 in a width direction.

Second films 600 having opposite orientations in a longitudinal direction are alternately arranged in the width direction of raw film F. In this way, combined margin part 601A is formed by two second insulating margin parts 601 adjacent to each other.

In fourth nozzle 1211d, nozzle holes 1212d are formed at positions respectively corresponding to two combined margin parts 601A formed on raw film F. From respective nozzle holes 1212d, the vaporized oil is sprayed. As for fourth nozzle 1211d, a distance from each nozzle hole 1212d to raw film F and a spray angle of each nozzle hole 1212d are set such that a spray width on a front surface of raw film F becomes equal to a width of each combined margin part 601A.

Fourth printing roll 1330d includes four fourth relief parts 1336 disposed on a peripheral surface of Fourth printing roll 1330d. Fourth relief part 1336 is formed to slightly protrude with respect to the peripheral surface. Fourth relief part 1336 has pattern shapes corresponding to longitudinal slit parts 801 and width-direction slit parts 802.

Figure 14A:
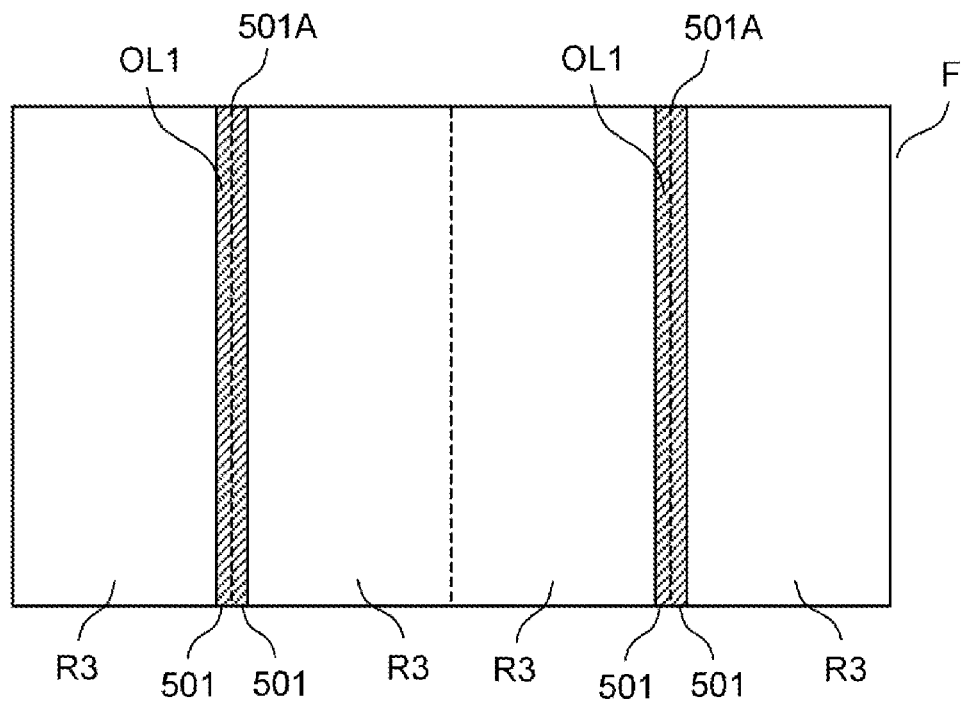
FIGS. 14A to 14C are views for explaining a process flow of treatments of a raw film on which first deposition electrodes are formed and which is split into the plurality of first films according to the second exemplary embodiment.
Figure 14B:
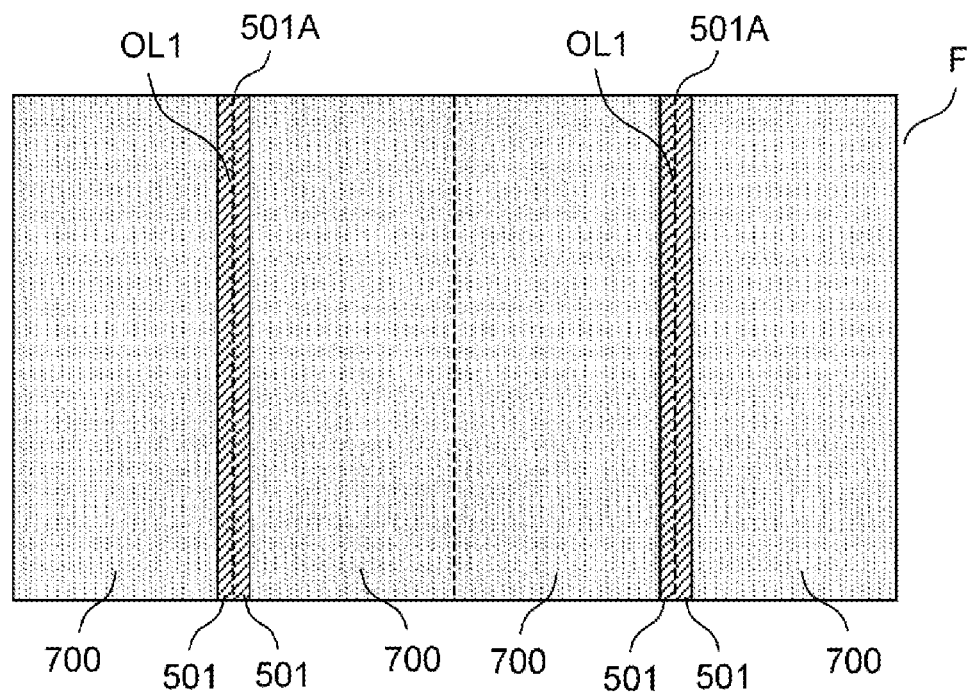
Figure 14C:
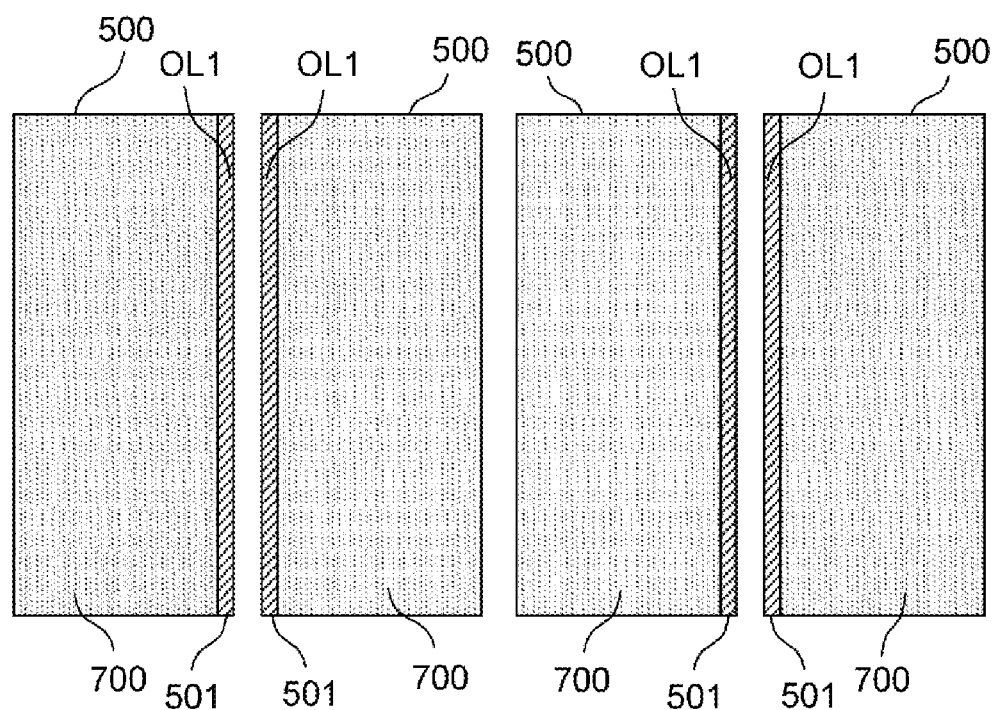

FIGS. 14A to 14C are views for explaining a process flow of treatments of raw film F on which first deposition electrodes 700 are formed and which is cut into the plurality of first films 500 according to the second exemplary embodiment.

When raw film F passes through oil spray unit 1200, i.e., passes third nozzle 1211c, oil OL1 from third nozzle 1211c is applied to entire regions corresponding to combined margin parts 501A of raw film F as shown in FIG. 14A. At this time, by adjusting conditions such as viscosity, temperature, spray amount, and spray pressure of oil OL1, it is possible to form clear outlines of end portions of first insulating margin parts 501 formed by oil OL1. Thus, clear boundaries between first insulating margin parts 501 and electrode forming regions R3 where first deposition electrodes 700 are formed. Then, when raw film F passes through electrode deposition unit 1400, first deposition electrodes 700 are formed in the regions of raw film F which are not applied with oil OL1, i.e., electrode forming regions R3 as shown in FIG. 14B. Then, when raw film F is cut to split in the width direction, respective first films 500 on which first deposition electrodes 700 are formed are completed as shown in FIG. 14C. Oil OL1 remains as it is on first film 500.

FIGS. 15A to 15D are views for explaining a process flow of treatments of raw film F on which second deposition electrodes 800 are formed and which is cut into the plurality of second films 600 according to the second exemplary embodiment.

Figure 15A:
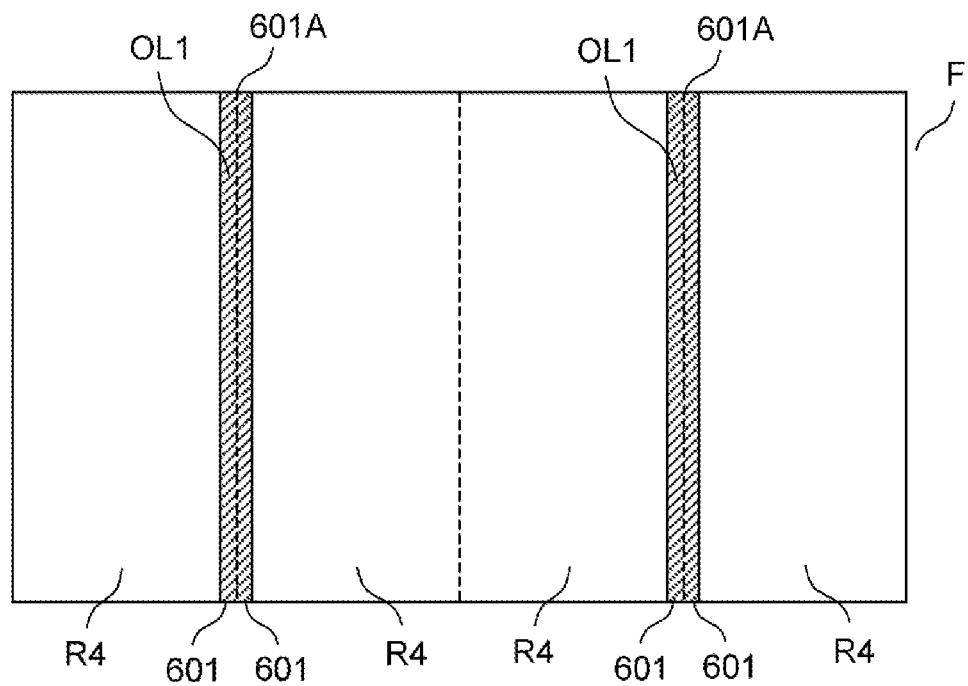
FIGS. 15A to 15D are views for explaining a process flow of treatments of a raw film on which second deposition electrodes are formed and which is split into the plurality of second films according to the second exemplary embodiment.
Figure 15B:
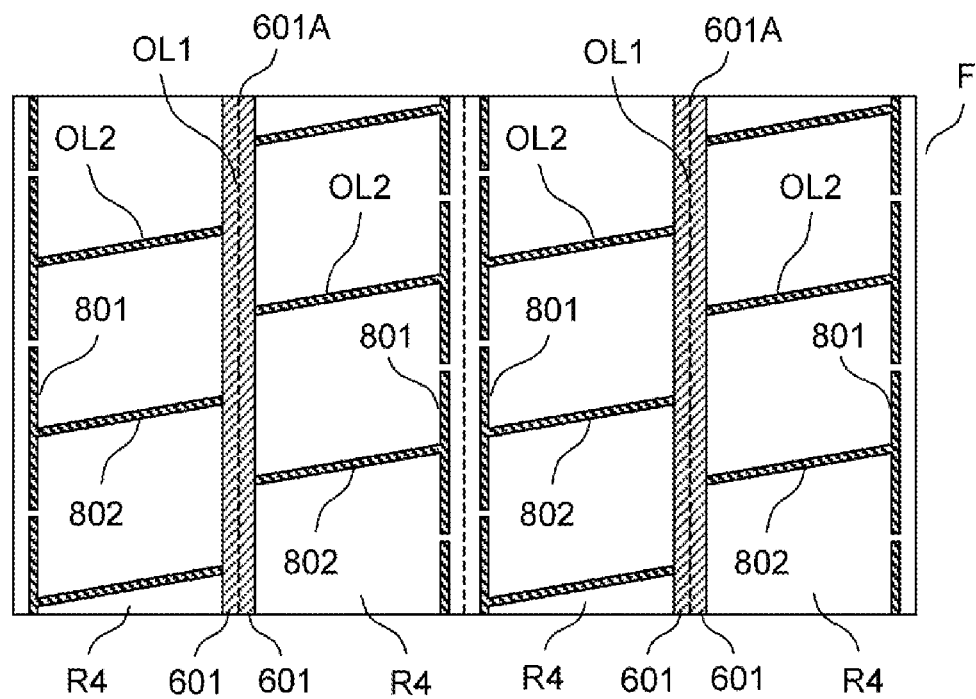
Figure 15C:
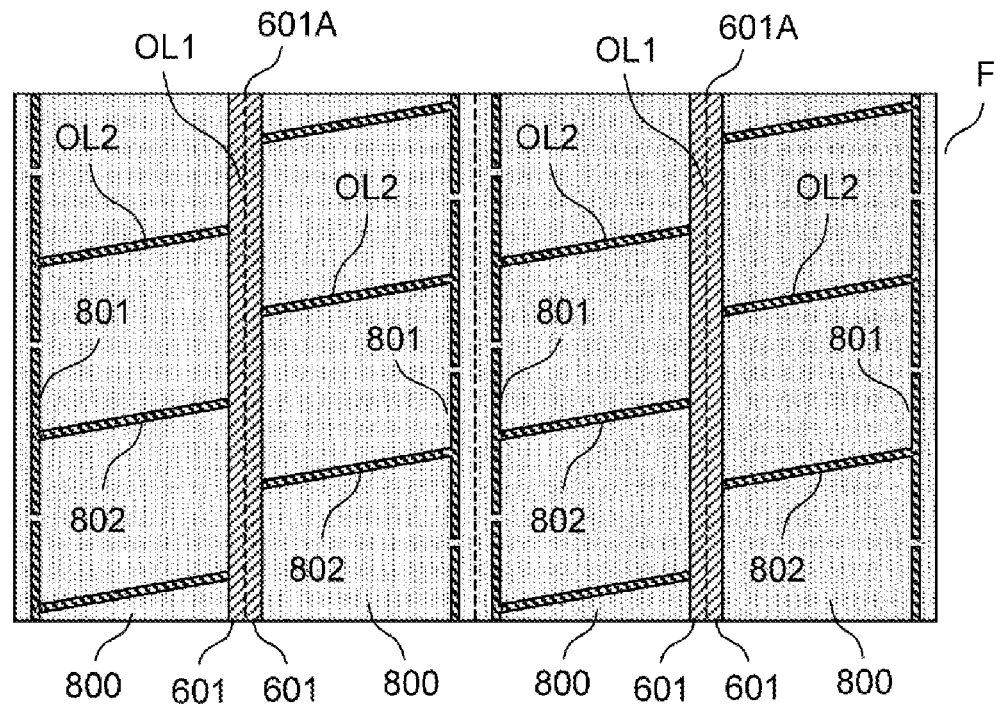
Figure 15D:
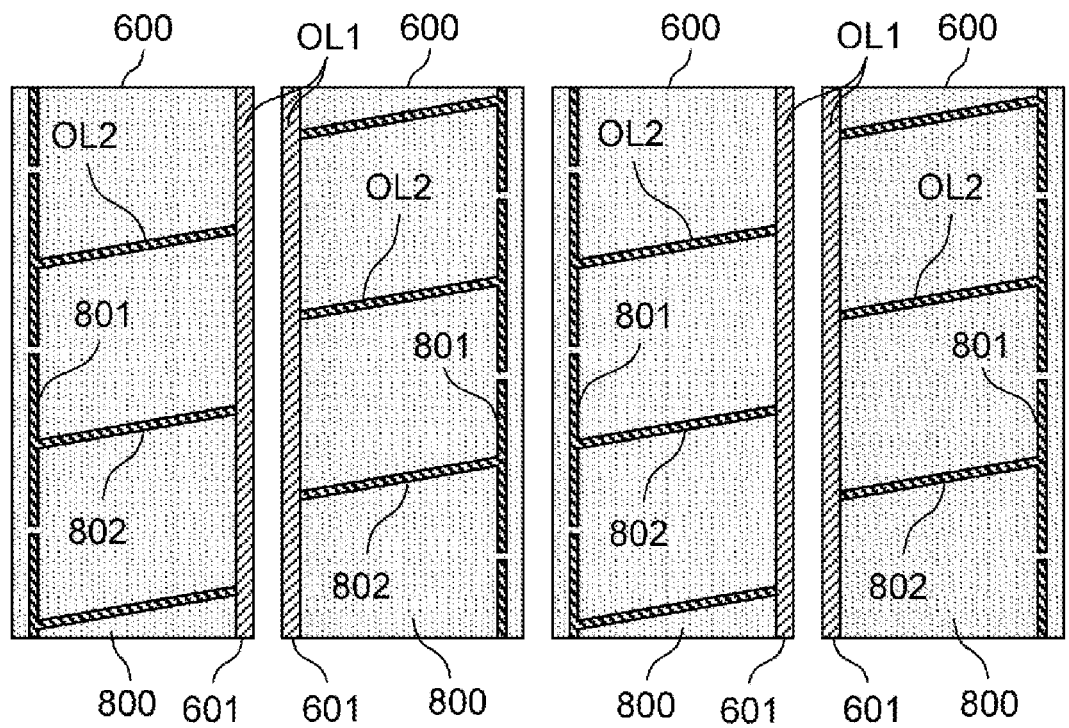

When raw film F passes through oil spray unit 1200, i.e., passes fourth nozzle 1211d, oil OL1 from fourth nozzle 1211d is applied to entire regions corresponding to combined margin parts 601A of raw film F as shown in FIG. 15A. Here, again, by adjusting conditions such as viscosity, temperature, spray amount, and spray pressure of oil OL1, it is possible to form clear outlines of end portions of second insulating margin parts 601 formed by oil OL1. Thus, clear boundaries between second insulating margin parts 601 and electrode forming regions R4 where second deposition electrodes 800 are formed. Then, when raw film F passes through oil printing unit 1300, i.e., passes fourth printing roll 1330d, fourth relief parts 1336 come in contact with the front surface of raw film F. Thus, oil OL2 on fourth relief parts 1336 is transferred, and oil OL2 is applied to positions of longitudinal slit parts 801 and width-direction slit parts 802 as shown in FIG. 15B. Then when raw film F passes through electrode deposition unit 1400, second deposition electrodes 800 are formed in the regions of raw film F which are not applied with oil OL1, OL2 as shown in FIG. 15C. Then, when raw film F is cut to split in the width direction, respective second films 600 on which second deposition electrodes 800 are formed are completed as shown in FIG. 15D. Each of oil OL1, OL2 remains as it is on second film 600.

<Effects of Second Exemplary Embodiment>

According to the present exemplary embodiment, it is possible to form a clear boundary between first deposition electrode 700 and first insulating margin part 501 on first film 500 to thereby make a length of a region having a light transmittance ranging from 30% to 80%, inclusive, less than or equal to 0.5 mm in the boundary. Similarly, it is possible to form a clear boundary between second deposition electrode 800 and second insulating margin part 601 on second film 600 to thereby make a length of a region having a light transmittance ranging from 30% to 80%, inclusive, less than or equal to 0.5 mm in the boundary. As a result, it is possible to substantially decrease a capacitance change rate of film capacitor 1B after long-term use. For example, a conventional standard of the capacitance change rate is about ±7% and film capacitor 1B can meet a capacitance change rate of ±3% that is a higher standard less than or equal to a half of the conventional standard.

Modifications

Although the exemplary embodiments of the present disclosure have been described above, the present disclosure is not limited to the exemplary embodiments described above and application examples of the present disclosure can include various modifications in addition to the above exemplary embodiments.

Figure 16A:
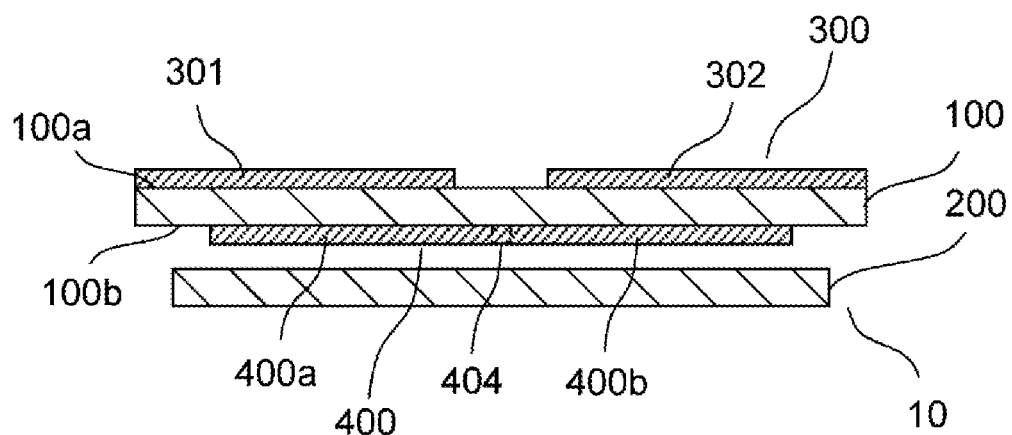
FIGS. 16A to 16F are views for explaining capacitor bodies according to modifications.
Figure 16B:
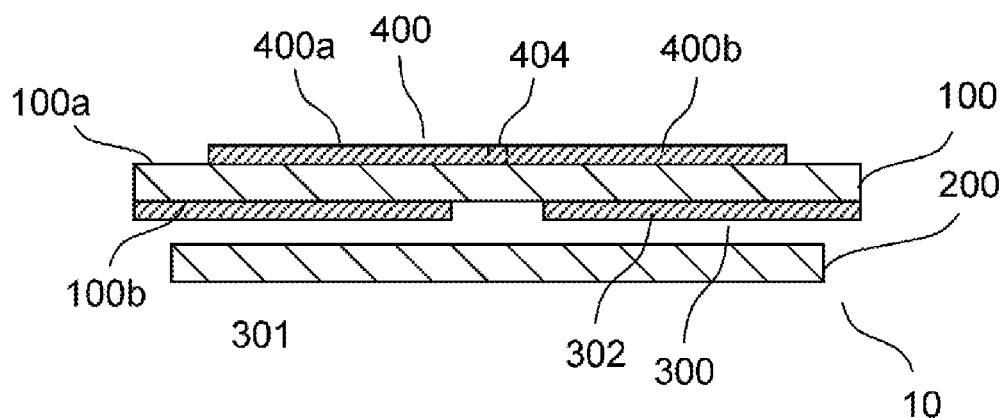
Figure 16C:
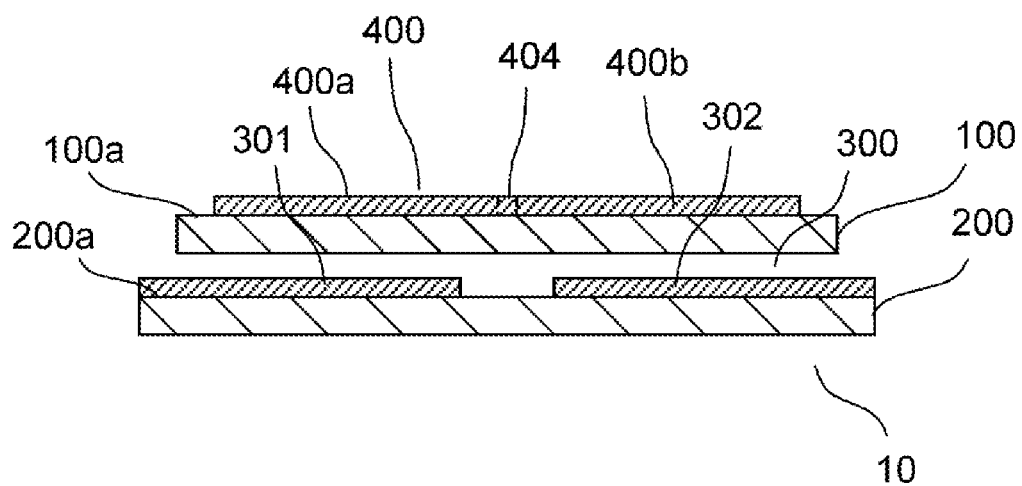

For example, in the above first exemplary embodiment, first deposition electrode 300 is formed on one (upper) main surface 100a of first film 100 and second deposition electrode 400 is formed on one (upper) main surface 200a of second film 200. However, as shown in FIG. 16A, first deposition electrode 300 may be formed on one (upper) main surface 100a of first film 100 and second deposition electrode 400 may be formed on the other (lower) main surface 100b of first film 100. As shown in FIG. 16B, second deposition electrode 400 may be formed on one (upper) main surface 100a of first film 100 and first deposition electrode 300 may be formed on the other (lower) main surface 100b of first film 100. As shown in FIG. 16C, second deposition electrode 400 may be formed on one (upper) main surface 100a of first film 100 and first deposition electrode 300 may be formed on one (upper) main surface 200a of second film 200. In this case, second film 200 has a larger width dimension than first film 100.

Figure 16D:
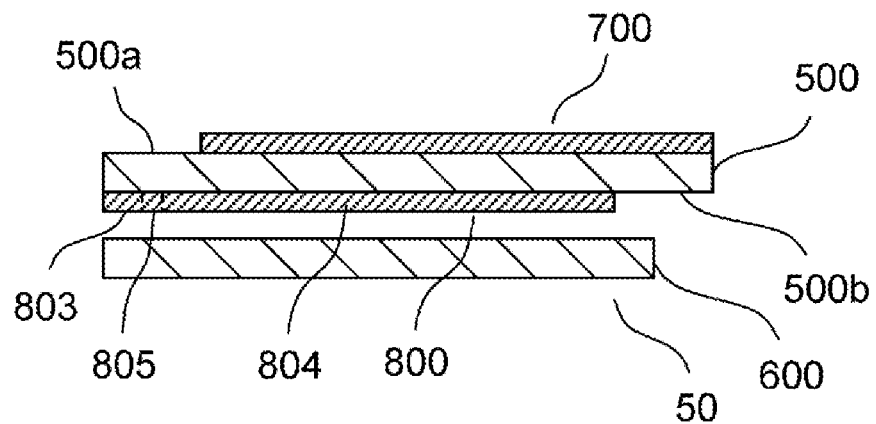
Figure 16E:
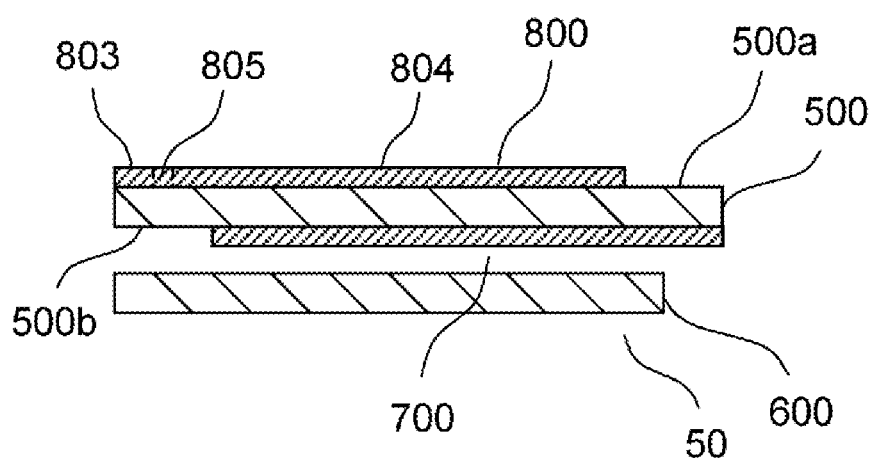
Figure 16F:
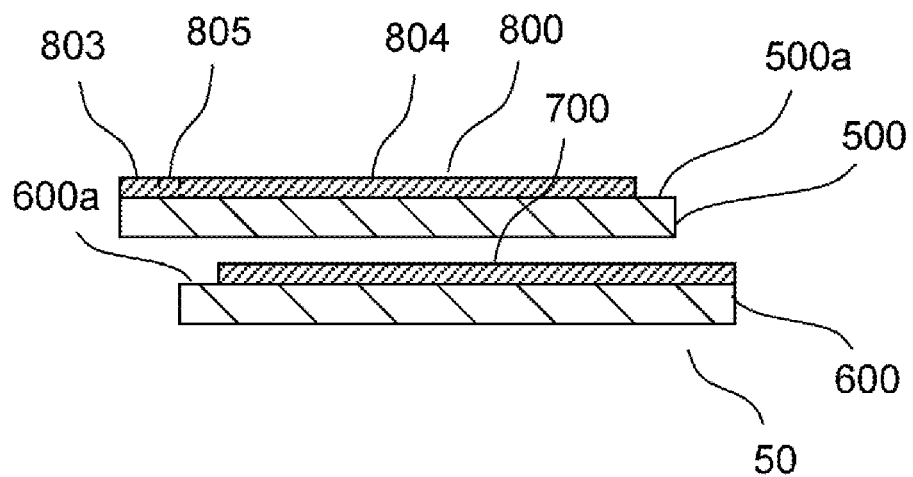

In the above second exemplary embodiment, first deposition electrode 700 is formed on one (upper) main surface 500a of first film 500 and second deposition electrode 800 is formed on one (upper) main surface 600a of second film 600. However, as shown in FIG. 16D, first deposition electrode 700 may be formed on one (upper) main surface 500a of first film 500 and second deposition electrode 800 may be formed on the other (lower) main surface 500b of first film 500. As shown in FIG. 16E, second deposition electrode 800 may be formed on one (upper) main surface 500a of first film 500 and first deposition electrode 700 may be formed on the other (lower) main surface 500b of first film 500. In these cases, first film 500 has a larger width dimension than second film 600. As shown in FIG. 16F, second deposition electrode 800 may be formed on one (upper) main surface 500a of first film 500 and first deposition electrode 700 may be formed on one (upper) main surface 600a of second film 600.

In manufacturing processes of film capacitors 1A, 1B according to the modifications, first deposition electrodes 300, 700 and second deposition electrodes 400, 800 are formed by use of deposition apparatus 1000 as in the first and second exemplary embodiments.

Although the oil is used as the masking agent in the above first and second exemplary embodiments, masking agents other than the oil may be used instead.

Although an oil spraying method is used as a method of applying the oil to the non-electrode parts continuously extending in the longitudinal direction in the above first and second exemplary embodiments, it is also possible to use other known methods than the oil spraying method. For example, an oil printing method using a printing roll, a screen printing method using a screen, or what is called a "curtain coating method" in which oil is dropped may be used. In these cases, it is possible to form clear outlines of end portions of insulating margin parts formed by the oil to thereby form clear boundaries between the insulating margin parts and electrode forming regions where deposition electrodes are formed.

Furthermore, according to the first exemplary embodiment mentioned above, capacitor body 10 is composed of, but not limited thereto, wound first film 100 and second film 200. More specifically, in FIGS. 1A and 2A, capacitor body 10 of first film 100 and second film 200 alternately layered may be adopted in place of capacitor body 10 of wound first film 100 and second film 200. In such a case, for the sake of convenience, a direction connecting first end-face electrode 30 and second end-face electrode 40 is referred to as a width direction, and a direction perpendicular to the connecting direction is referred to as a longitudinal direction. Similarly, in FIGS. 10A and 11A, capacitor body 50 of first film 500 and second film 600 alternately layered may be adopted in place of capacitor body 50 of wound first film 500 and second film 600. In such a case, for the sake of convenience, a direction connecting first end-face electrode 70 and second end-face electrode 80 is referred to as a width direction, and a direction perpendicular to the connecting direction is referred to as a longitudinal direction.

In the above first exemplary embodiment, the present disclosure is applied to film capacitor 1A structured to have two capacitors connected in series. However, the present disclosure can also be applied to a film capacitor structured to have three or more capacitors connected in series.

In addition, various modifications can be appropriately made to the exemplary embodiments of the present disclosure within the scope of the technical idea disclosed in the claims.

The present disclosure is useful for a film capacitor used in various electronic devices, electric devices, industrial devices, vehicular electrical equipment, and the like.

What is claimed is:

1. A film capacitor comprising:
a first film and a second film that are wound or layered in a stacked state;
a first electrode part disposed on a first film surface that is one main surface of the first film, the first electrode part including an aluminum-containing layer; and
a second electrode part disposed on a second film surface that is another main surface of the first film or a main surface of the second film facing the another main surface of the first film, the second electrode part including an aluminum-containing layer, wherein:
the first film surface has a first non-electrode part on which the first electrode part is not disposed, the first non-electrode part extending along a longitudinal direction of the first film surface,
the second film surface has a second non-electrode part on which the second electrode part is not disposed, the second non-electrode part extending along a longitudinal direction of the second film surface,
a first region having a light transmittance ranging from 30% to 80%, inclusive, is disposed between the first electrode part and the first non-electrode part, a width of the first region being less than or equal to 0.5 mm in a width direction perpendicular to the longitudinal direction of the first film surface, and
a second region having a light transmittance ranging from 30% to 80%, inclusive, is disposed between the second electrode part and the second non-electrode part, a width of the second region being less than or equal to 0.5 mm in a width direction perpendicular to the longitudinal direction of the second film surface.

2. The film capacitor according to claim 1, wherein:
the first non-electrode part is a continuous region that is not disconnected in the longitudinal direction of the first film surface, and
the second non-electrode part is a continuous region that is not disconnected in the longitudinal direction of the second film surface.

3. The film capacitor according to claim 1, wherein:
the width of the first region is more than or equal to 0.3 mm in the width direction of the first film surface, and
the width of the second region is more than or equal to 0.3 mm in the width direction of the second film surface.

4. A film capacitor comprising:
a first film and a second film that are wound or layered in a stacked state;
a first electrode part disposed on a first film surface that is one main surface of the first film, the first electrode part including an aluminum-containing layer; and
a second electrode part disposed on a second film surface that is another main surface of the first film or a main surface of the second film facing the another main surface of the first film, the second electrode part including an aluminum-containing layer, wherein:
the first film surface has a first non-electrode part on which the first electrode part is not disposed, the first non-electrode part being disposed to split the first electrode part into two parts in a width direction perpendicular to a longitudinal direction of the first film surface, and extending along the longitudinal direction of the first film surface,
the second film surface has second non-electrode parts on which the second electrode part is not disposed, the second non-electrode part being disposed at each of both end portions in a width direction perpendicular to a longitudinal direction of the second film surface, and extending along the longitudinal direction of the second film surface,
a first region having a light transmittance ranging from 30% to 80%, inclusive, is disposed between the first electrode part and the first non-electrode part, a width of the first region being less than or equal to 0.5 mm in the width direction of the first film surface, and a second region having a light transmittance ranging from 30% to 80%, inclusive, is disposed between the second electrode part and the second non-electrode part, a width of the second region being less than or equal to 0.5 mm in the width direction of the second film surface.

5. The film capacitor according to claim 4, wherein:

the first non-electrode part is a continuous region that is not disconnected in the longitudinal direction of the first film surface, and the second non-electrode parts is a continuous region that is not disconnected in the longitudinal direction of the second film surface.

6. The film capacitor according to claim 4, wherein:

the width of the first region is more than or equal to 0.3 mm in the width direction of the first film surface, and the width of the second region is more than or equal to 0.3 mm in the width direction of the second film surface.

\* \* \* \* \*